US011451497B2

(12) United States Patent
Eidelman et al.

(10) Patent No.: US 11,451,497 B2
(45) Date of Patent: *Sep. 20, 2022

(54) USE OF MACHINE-LEARNING MODELS IN CREATING MESSAGES FOR ADVOCACY CAMPAIGNS

(71) Applicant: FiscalNote, Inc., Washington, DC (US)

(72) Inventors: Vladimir Eidelman, Chevy Chase, MD (US); Daniel Argyle, Provo, UT (US); Paul Matthew Ellender, Jr., Baton Rouge, LA (US); Anastassia Kornilova, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,780

(22) Filed: Feb. 28, 2022

(65) Prior Publication Data
US 2022/0191155 A1    Jun. 16, 2022

Related U.S. Application Data

(63) Continuation of application No. 17/453,647, filed on Nov. 4, 2021, now Pat. No. 11,316,808, which is a
(Continued)

(51) Int. Cl.
*G06F 40/40* (2020.01)
*H04L 51/02* (2022.01)
(Continued)

(52) U.S. Cl.
CPC .............. *H04L 51/02* (2013.01); *G06F 40/40* (2020.01); *G06N 20/20* (2019.01); *H04L 51/18* (2013.01); *H04L 51/52* (2022.05)

(58) Field of Classification Search
CPC ......... G06F 40/40; G06N 20/20; H04L 51/02; H04L 51/18; H04L 51/32; H04L 51/52
See application file for complete search history.

(56) References Cited

U.S. PATENT DOCUMENTS 10,778,628 B2* 9/2020 Brechbuhl .............. H04W 4/12
11,057,339 B1* 7/2021 Stoddart ................. H04L 51/38
(Continued)

OTHER PUBLICATIONS

PCT, "International Search Report and Written Opinion", International Application No. PCT/US21/72254, dated Feb. 28, 2022, 12 Pages.
(Continued)

*Primary Examiner* — Soe Hlaing
(74) *Attorney, Agent, or Firm* — Patent GC LLC; Alexander Franco

(57) ABSTRACT

An advocacy system uses trained machine learning models to create messages that are sent to advocates or policymakers to achieve desired outcomes for an organization. Desired outcomes can include, for example: an advocate sending a message to a policymaker or legislative representative advocating in favor or the organization's position on an issue; a policymaker acting or voting in favor of the organization's position on an issue; or an advocate making a financial contribution to the organization. The machine learning models can be configured to select possible message characteristics or features that the system will include/use in creating/sending messages to/for individual senders and recipients. The machine learning models can be trained based on message characteristics, personal profile characteristics of senders/recipients, and outcomes from previously sent messages. Personal profile characteristics of senders/recipients can indicate correlations between certain message characteristics and certain outcomes of sending messages.

20 Claims, 27 Drawing Sheets

Related U.S. Application Data continuation of application No. PCT/US2021/072254, filed on Nov. 4, 2021.

(60) Provisional application No. 63/109,852, filed on Nov. 4, 2020.

(51) Int. Cl.
*H04L 51/18* (2022.01)
*G06N 20/20* (2019.01)
*H04L 51/52* (2022.01)

(56) References Cited

U.S. PATENT DOCUMENTS

| | | |
|---|---|---|
| 2017/0308795 A1 | 10/2017 | Grom et al. |
| 2017/0308797 A1 | 10/2017 | Palombi et al. |
| 2017/0308798 A1 | 10/2017 | Grom et al. |
| 2017/0308799 A1 | 10/2017 | Eidelman et al. |
| 2017/0308975 A1 | 10/2017 | Eidelman et al. |
| 2017/0308976 A1 | 10/2017 | Eidelman et al. |
| 2017/0308984 A1 | 10/2017 | Eidelman et al. |
| 2017/0308985 A1 | 10/2017 | Grom et al. |
| 2017/0308986 A1 | 10/2017 | Simpson et al. |
| 2019/0122321 A1 | 4/2019 | Eidelman et al. |
| 2020/0211141 A1 | 7/2020 | Argyle et al. |
| 2021/0118076 A1 | 4/2021 | Eidelman et al. |
| 2021/0142433 A1 | 5/2021 | Eidelman et al. |

OTHER PUBLICATIONS

U.S. Patent and Trademark Office, "Notice of Allowance Received", U.S. Appl. No. 17/453,647, dated Feb. 24, 2022, 36 Pages.

* cited by examiner

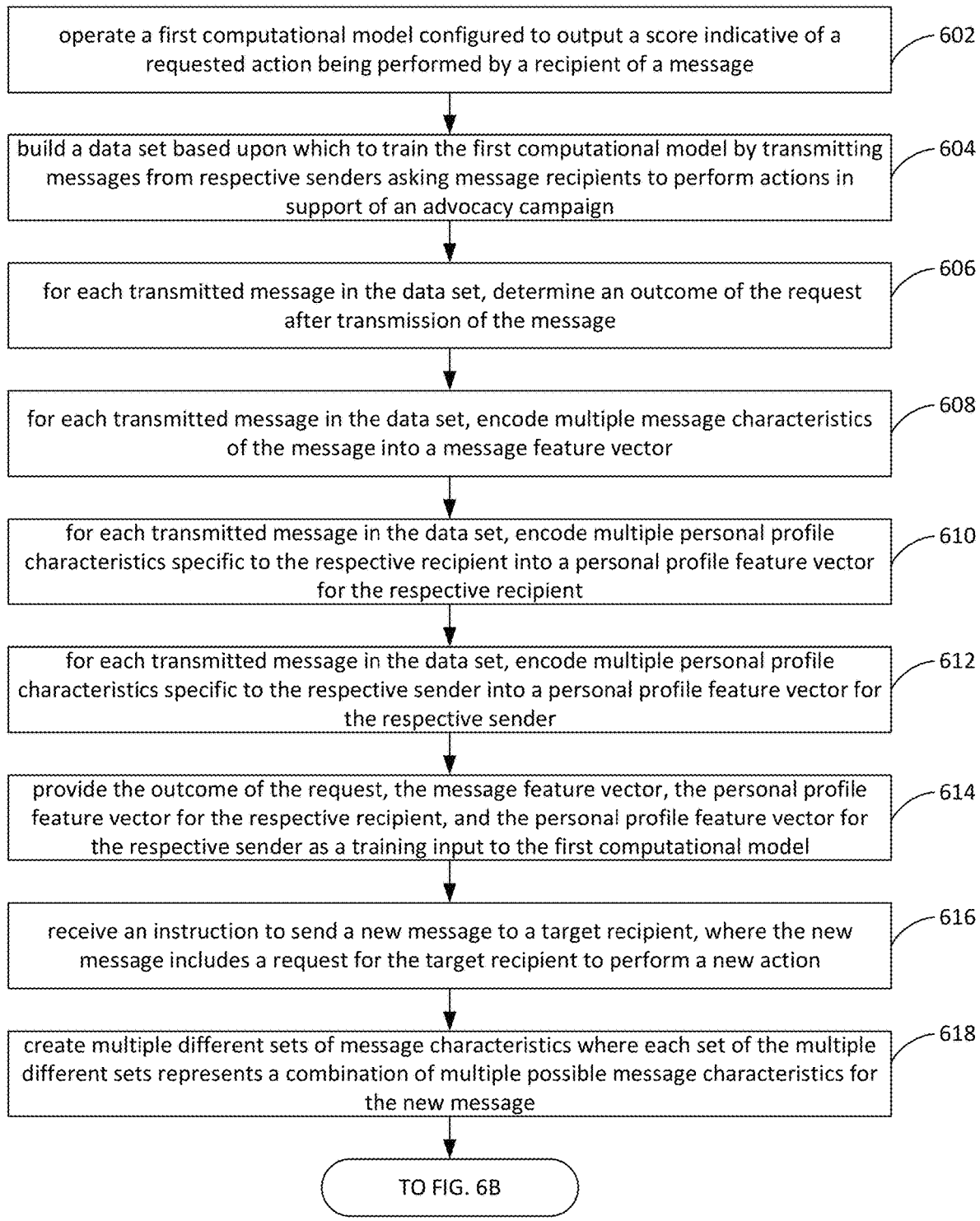

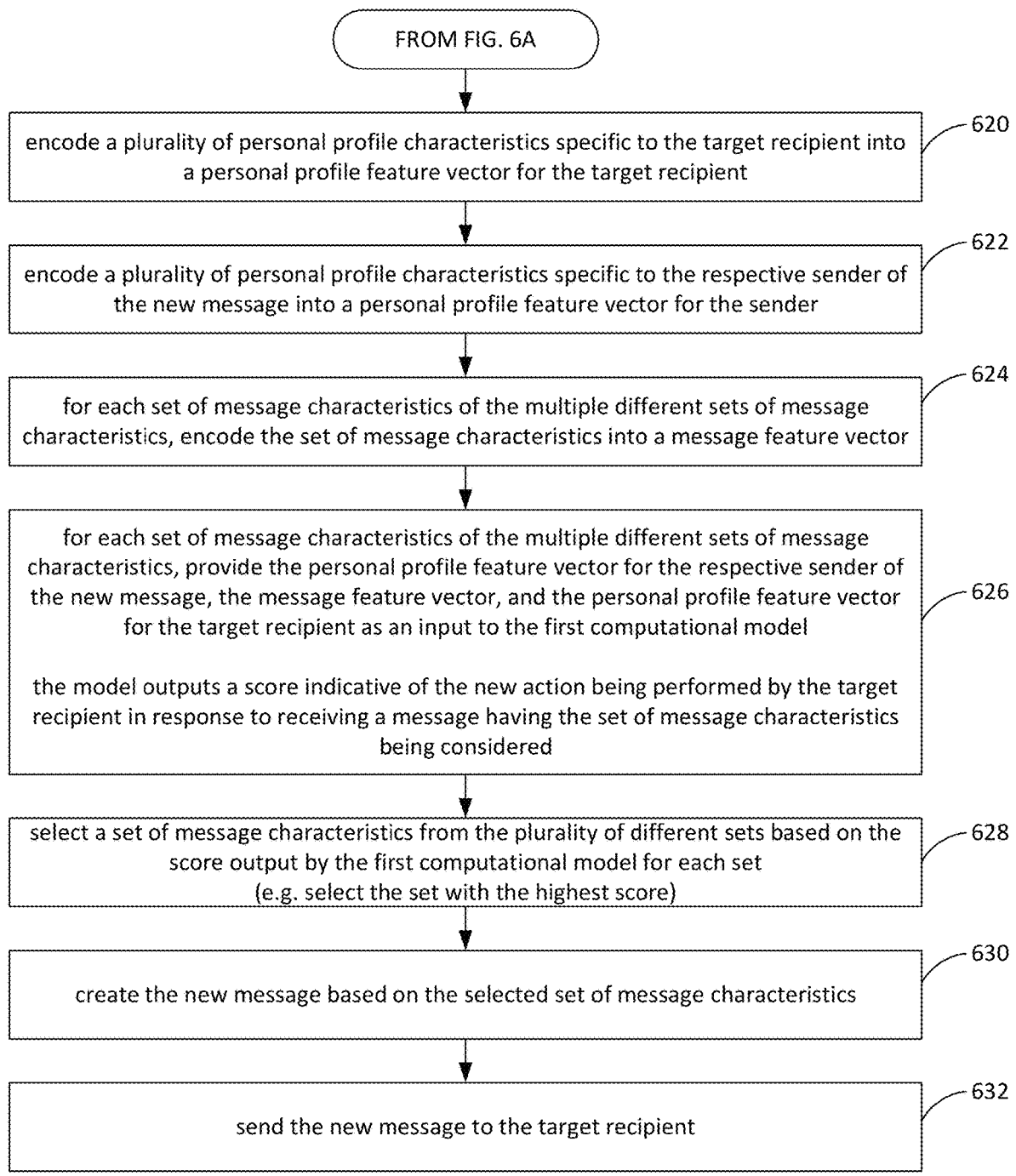

USE OF MACHINE-LEARNING MODELS IN CREATING MESSAGES FOR ADVOCACY CAMPAIGNS

RELATED APPLICATIONS

The subject matter of this application is related to U.S. Utility patent application Ser. No. 17/453,647, filed on 2021 Nov. 4, Patent Cooperation Treaty Application PCT/US2021/072254, filed on 2021 Nov. 4, and U.S. Provisional Application No. 63/109,852, filed on 2020 Nov. 4, all of which applications are incorporated herein by reference in their entireties.

BACKGROUND OF THE INVENTION

VoterVoice is a web-based advocacy system that enables organizations to manage campaigns that can be used to inform advocates of issues and to facilitate efforts by those advocates to support the organizations' goals with respect to the issues. An organization using the VoterVoice system can be any entity, such as a corporation, company, partnership, interest group, an individual, or a plurality of individuals acting as a group. An organization may have an advocacy objective, which can include, for example, causing legislation to be enacted in support of the organization's position on an issue, raising societal awareness of the issue, or receiving financial support in favor of the position. In order to achieve the objective, an organization will typically take action to inform targeted individuals about the issue or the position, which in turn may cause those individuals to take action as advocates on behalf of the organization. The advocates' actions can include, for example, contacting their legislative representatives with messaging supporting legislation consistent with the organization's positon on the issue, providing financial support for the organization's positon, or even more generally becoming or being informed so that they might vote for elected representatives who would in turn support the organization's position.

An organization using the VoterVoice system will have an account on the VoterVoice website, and through the website it can create and manage individual advocacy campaigns. In a typical scenario, an organization's user will create a campaign that generates a message to each advocate of a selected set of advocates. Each message will typically request that the advocate, in turn, access a campaign web page (or web site), which can be hosted by the VoterVoice system and through which the advocate can send a message advocating the organization's position to one or more policymakers.

Figure 1D:
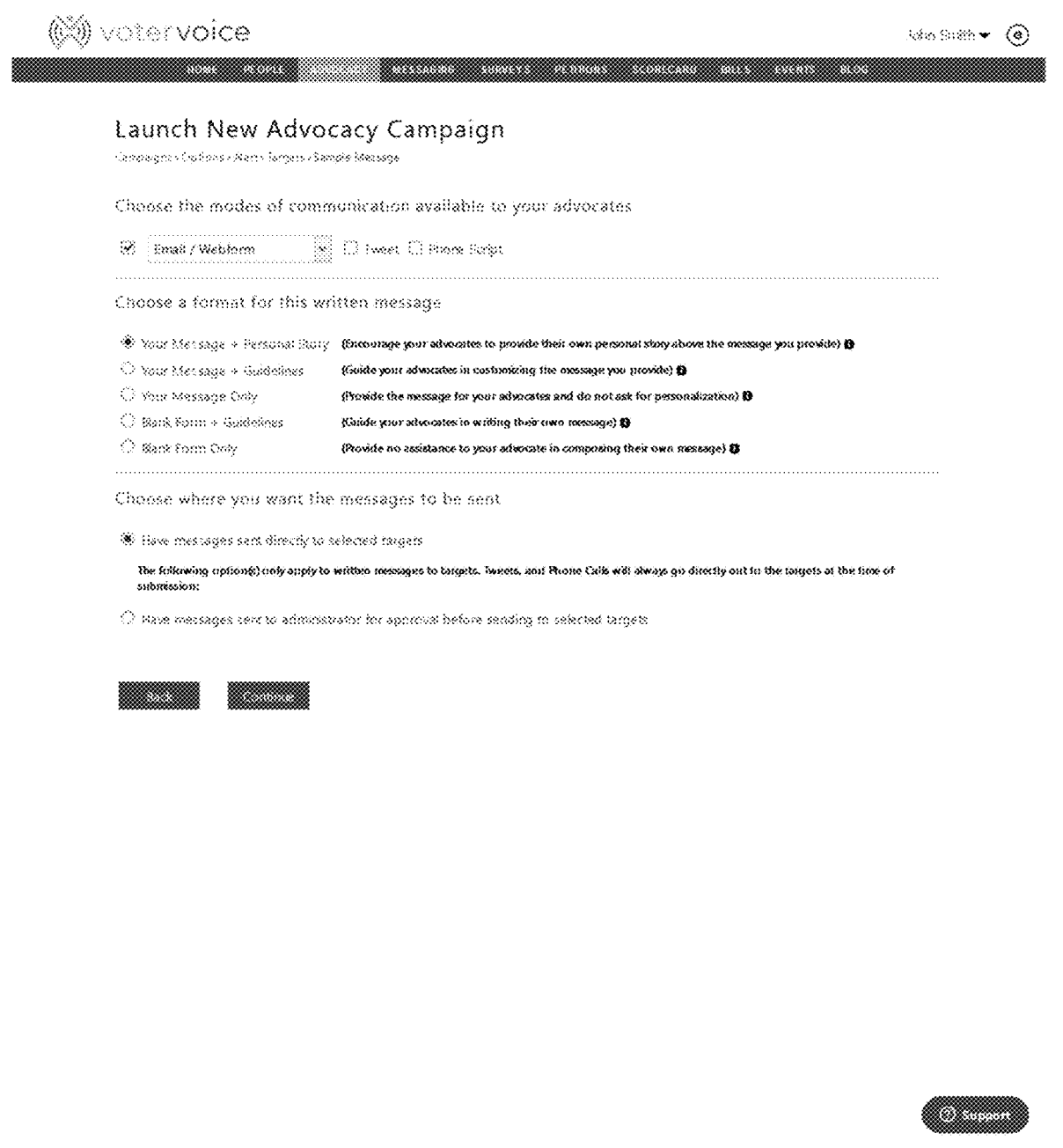
Figure 1E:
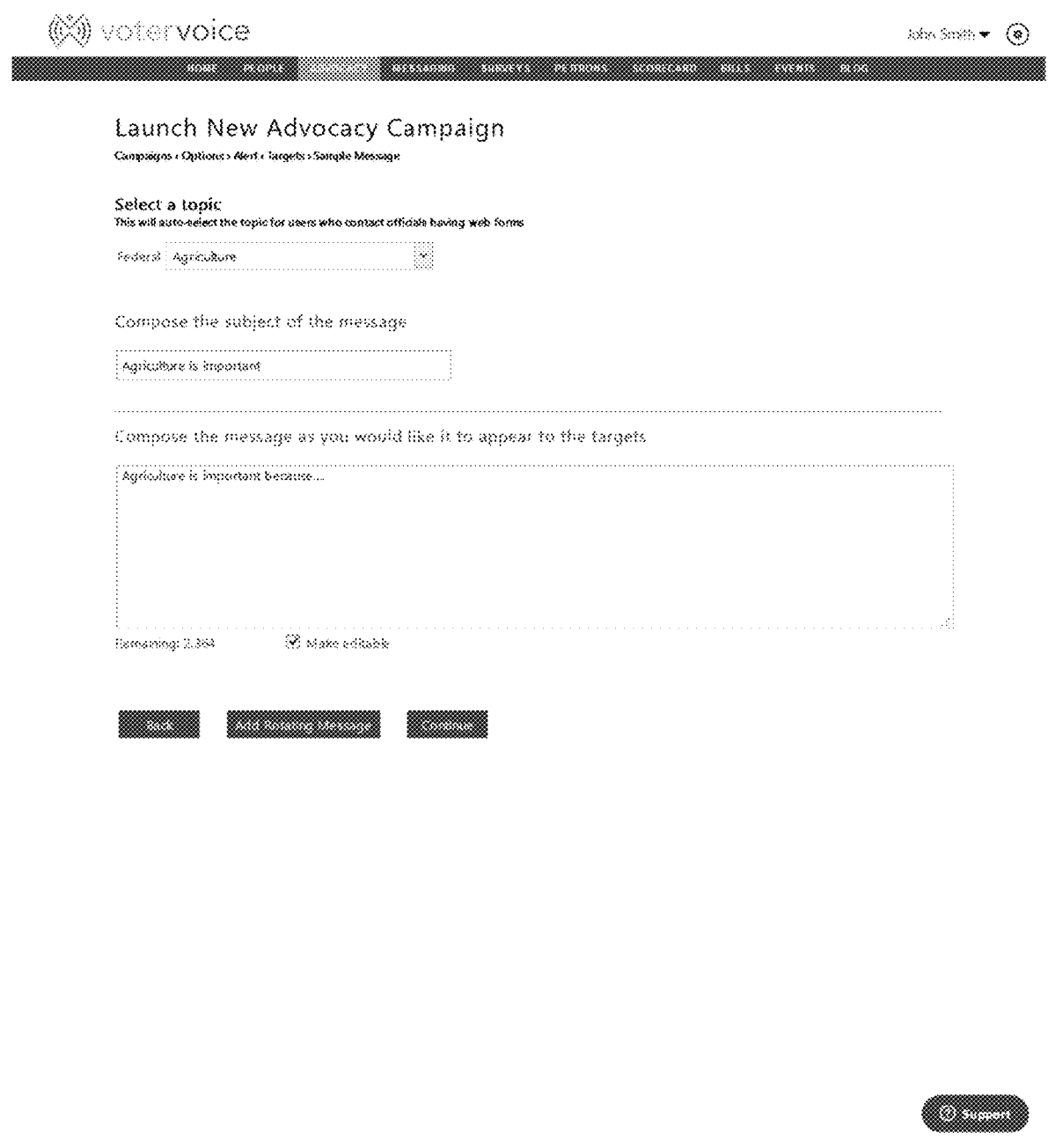
Figure 1H:
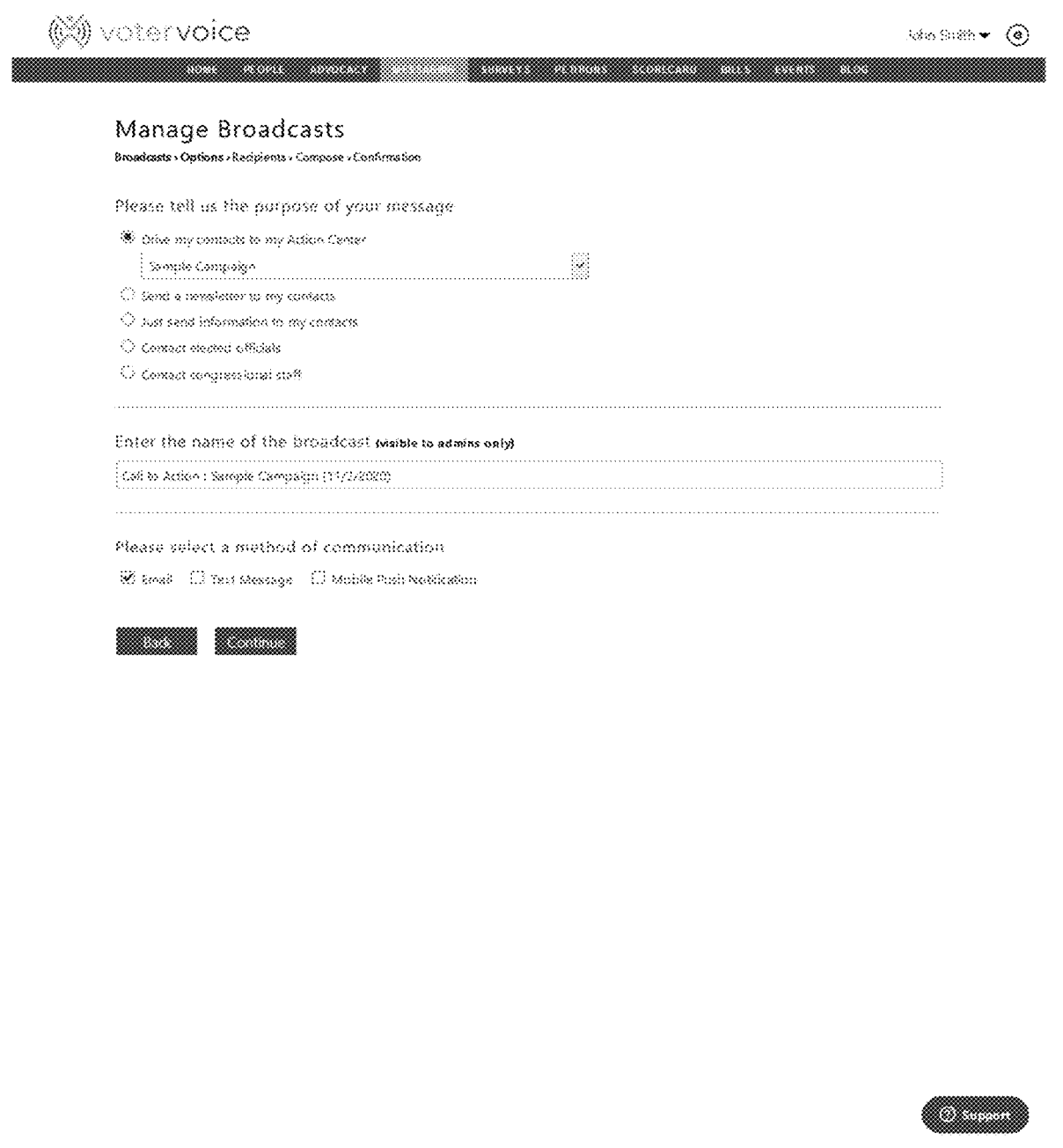
Figure 1J:
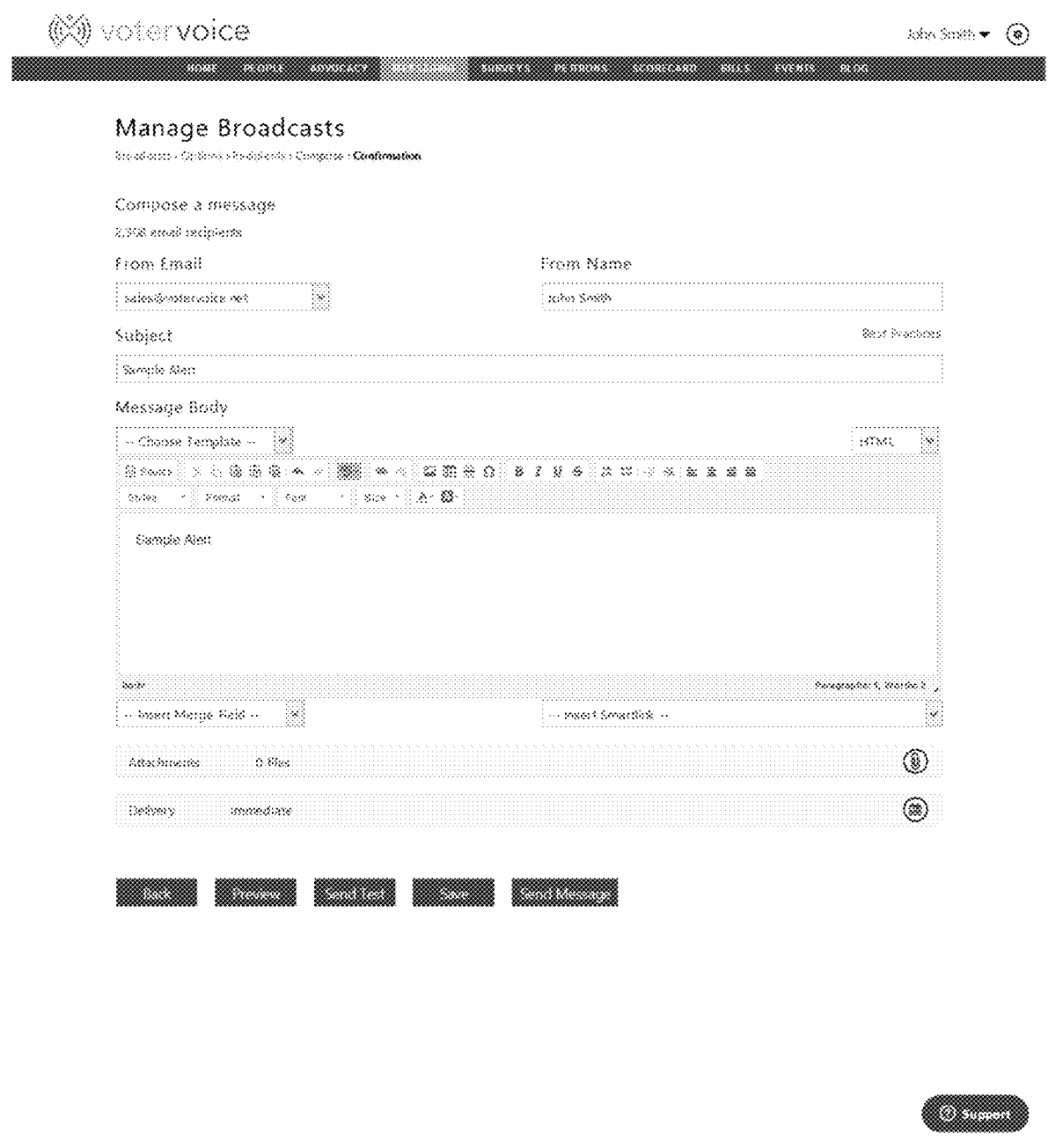
Figure 1L:
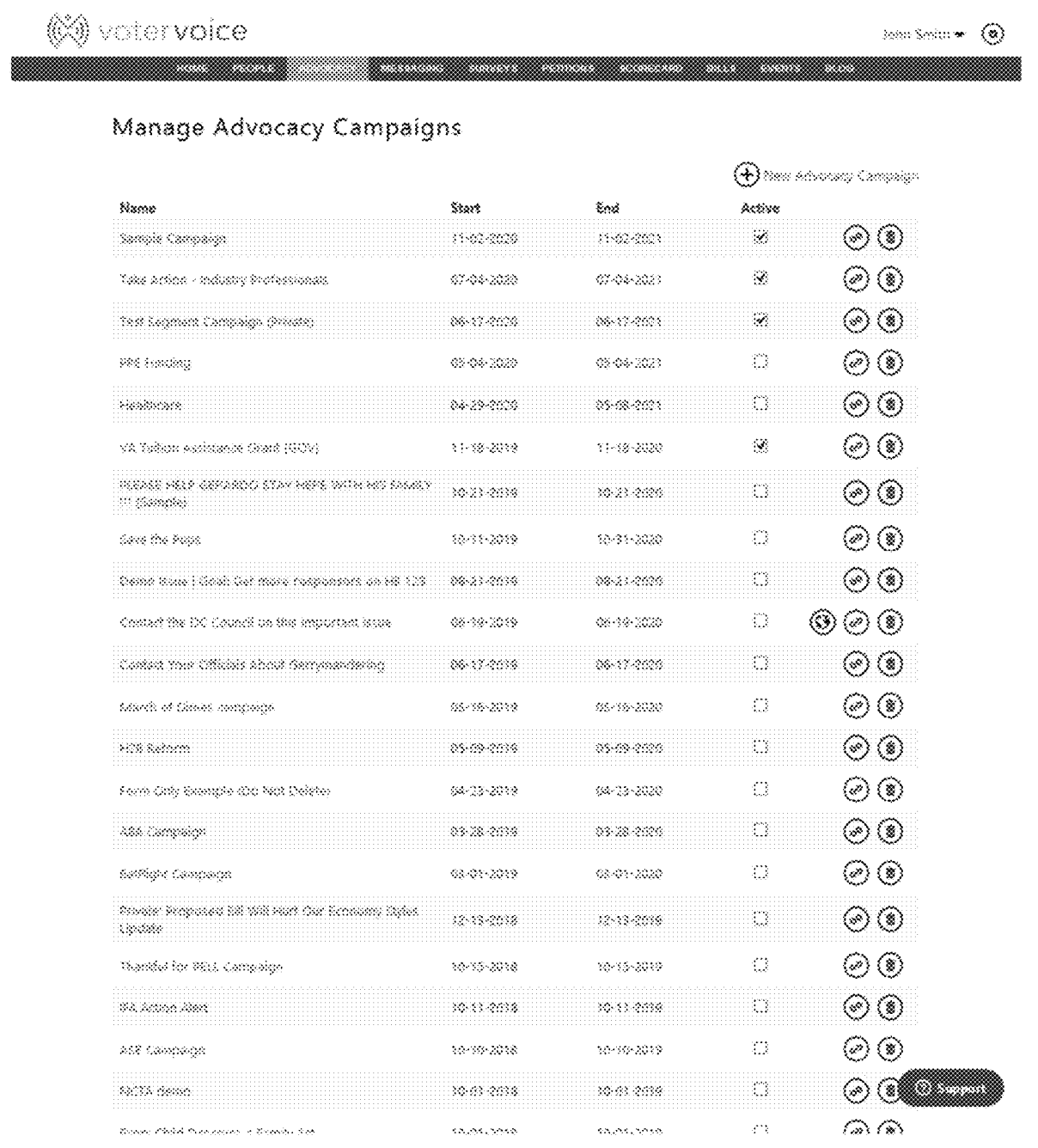

FIGS. 1A-M illustrate web page printouts of an example set of web pages on the VoterVoice website that an organization's user can use to create and launch an advocacy campaign. In FIG. 1A, the user enters or selects certain features of the campaign, such as a name of the campaign, a time frame, a campaign format, and a website upon which the campaign's advocate messaging web page interface will be displayed. In FIG. 1B, the user designs a campaign web page through which advocates can be informed of the organization's position on an issue along with an option to have advocates send messages to selected policymakers regarding the issue. In FIG. 1C, the user selects the policymakers to whom the organization seeks to have the advocates in turn send messages advocating the organization's position. The available sets of policymakers can be specified or loaded in advance by system administrators and made available for selection by users. In FIG. 1D, the user specifies the format of messages that the advocates will be asked to send to the policymakers. In FIG. 1E, the user uses a form to create a message template that will be used by the advocates to create the messages that will be sent to the policymakers. In FIG. 1F, the user is asked to confirm certain additional details about the campaign, such as confirmation messages to the advocates. In FIG. 1G, the user is shown an address of the campaign web page that advocates will be directed to along with options for promoting the campaign web page to advocates. The user is also provided an option for sending or broadcasting a message announcing the advocacy campaign. In FIG. 1H, the user selects an option to drive broadcast message recipients to the campaign page or action center for the campaign. In FIG. 1I, the user chooses a list of contacts to which to send the advocacy messages, among multiple lists that the user may have saved, along with optionally filtering the list. In FIG. 1J, the user uses a form to create a message template that will be used to send a message to each of the selected set of advocates or contacts. The user is also given options, to preview, test, save or send the broadcast message. In FIG. 1K, the user is shown a preview of the message that will be received by the contacts. In FIG. 1L, upon sending the advocacy message, the user is directed to a list of previously created advocacy campaigns, which also shows an option to create a new advocacy campaign. In FIG. 1M, upon selecting the just created advocacy campaign, the user is again shown the address of the campaign web page, which is hosted on a website for the organization.

FIGS. 2A-C illustrate web page printouts of an example set of web pages hosted by the system and that would be viewed by contacts, advocates, or potentially anyone landing on a campaign page. FIG. 2A shows a campaign web page for first sample campaign that would be viewed by a person who may not be recognized as a contact of the organization in the system. The campaign page provides fields for an advocate to compose, customize and send a message to a selected policymaker, in this case, "the president". The page also includes an area for the advocate to "Enter Your Info" to account for a person who may not be recognized by the system. FIG. 2B shows a campaign web page for a second sample campaign. This campaign page additionally provides an overview of the organization's position along with an option to compose, customize and send a message to a selected policymaker. In this case, the system has recognized the contact/advocate viewing the page as "Ms. Jane Doe", which may be a result of the contact having selected a personalized link in a broadcast message they may have received asking them to view the campaign page and/or message a policymaker. FIG. 2C shows a confirmation page that would be viewed by an advocate indicating that a message was sent to a policymaker on behalf of the advocate.

FIGS. 3A-C illustrate web page printouts of an example set of web pages on the VoterVoice website that an organization's user can use to manage contacts, such as advocates and policymakers. In FIG. 3A, the organization's user views a list of contacts/advocates maintained by the organization on the VoterVoice website. The organization can use or select from the list by filtering to obtain a set of contacts/advocates to which broadcast messages about an advocacy campaign web page are sent. The user is also provided an option of adding a new contact. In FIG. 3B, the user supplies and/or edits profile and/or contact information for a selected contact. In FIG. 3C, the user has browsed to a page showing details for one of the available policymakers to whom advocacy messages can be directed by advocates as part of an advocacy campaign.

The VoterVoice system as described above is prior art and has been publicly available for at least one year prior to the first priority date of the present application.

SUMMARY OF THE INVENTION

An advocacy system uses trained machine learning models to create messages that are sent to advocates or policymakers to achieve desired outcomes for an organization. Desired outcomes can include, for example: an advocate sending a message to a policymaker or legislative representative advocating in favor or the organization's position on an issue; a policymaker acting or voting in favor of the organization's position on an issue; or an advocate making a financial contribution to the organization. The machine learning models can be configured to select possible message characteristics or features that the system will include or use in creating or sending messages to or for individual senders and recipients. The machine learning models can be trained based on message characteristics, personal profile characteristics of senders or recipients, and outcomes from previously sent messages. Personal profile characteristics of senders or recipients can indicate correlations between certain message characteristics and certain outcomes of sending messages. The personal profiles can also contain facets of personal information about senders and/or recipients, which can be included in variable fields in predefined message templates.

More generally, the present disclosure describes systems and methods that incorporate machine learning or computational models into an advocacy system. An advocacy system can be configured to analyze a set of previously generated messages to automatically identify relevant factors for optimizing a desired action rate, and to use trained machine learning models to assist organizations and advocates in creating messages to advocates or policymakers. Information for inclusion in messages and/or based on which messages can be created can also include personal information gathered from other sources than previously sent messages, such as from users' interaction with the system. Information for inclusion in messages and/or based on which messages can be created can also include external information such as publicly available information.

BRIEF DESCRIPTION OF THE DRAWINGS

FIGS. 1A-M illustrate web page printouts of an example set of web pages on the VoterVoice website that an organization's user can use to create and launch an advocacy campaign.

FIGS. 2A-C illustrate web page printouts of an example set of web pages hosted by the system and that would be viewed by contacts, advocates, or potentially anyone landing on a campaign page.

FIGS. 3A-C illustrate web page printouts of an example set of web pages on the VoterVoice website that an organization's user can use to manage contacts, such as advocates and policymakers.

FIGS. 6A-B illustrate methods in accordance with various embodiments for using computational models to optimize outcomes of sending messages in support of an advocacy campaign.

DETAILED DESCRIPTION

Figure 1A:
Figure 1B:
Figure 1C:
Figure 1F:
Figure 1G:
Figure 1I:
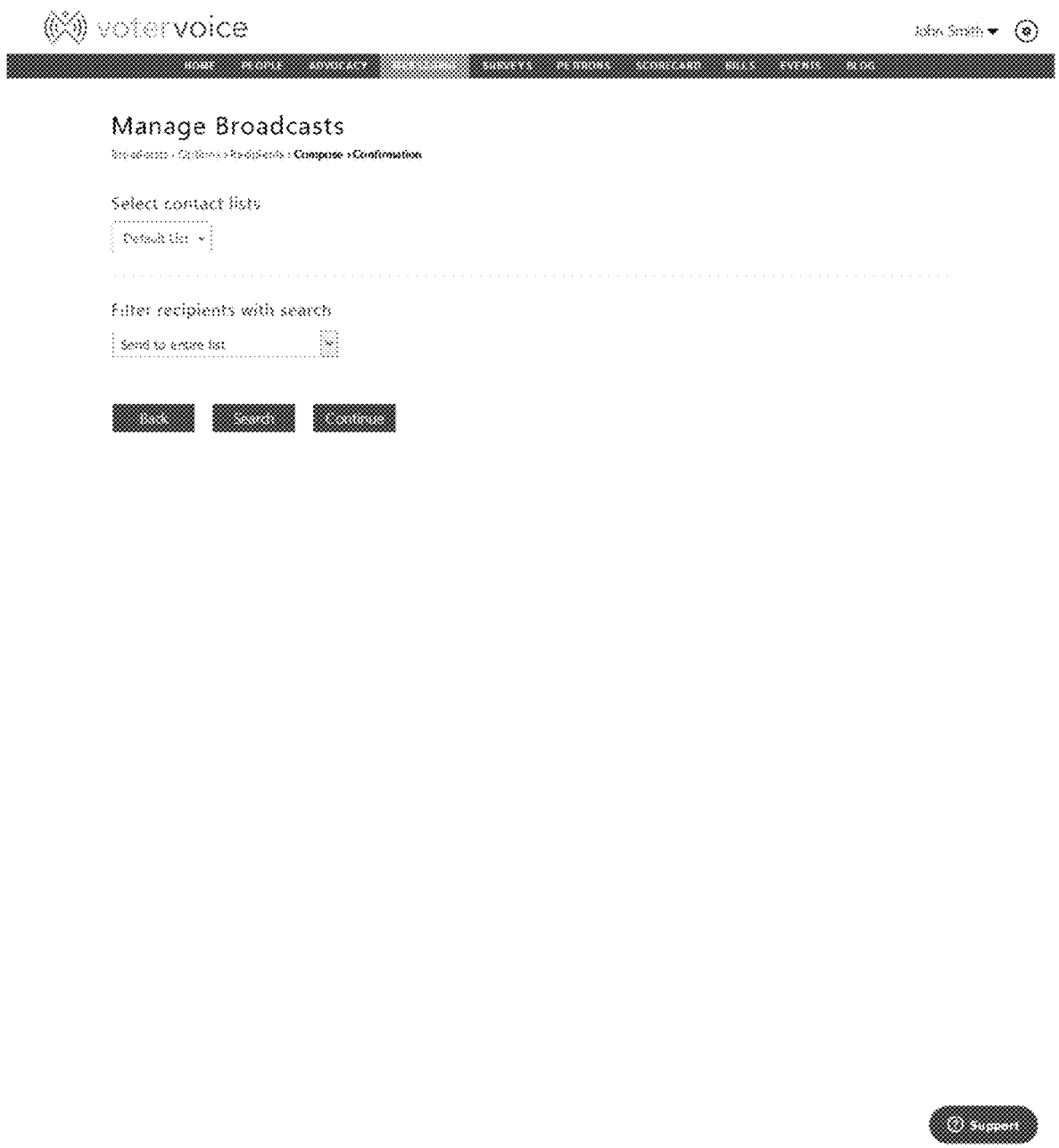
Figure 1K:
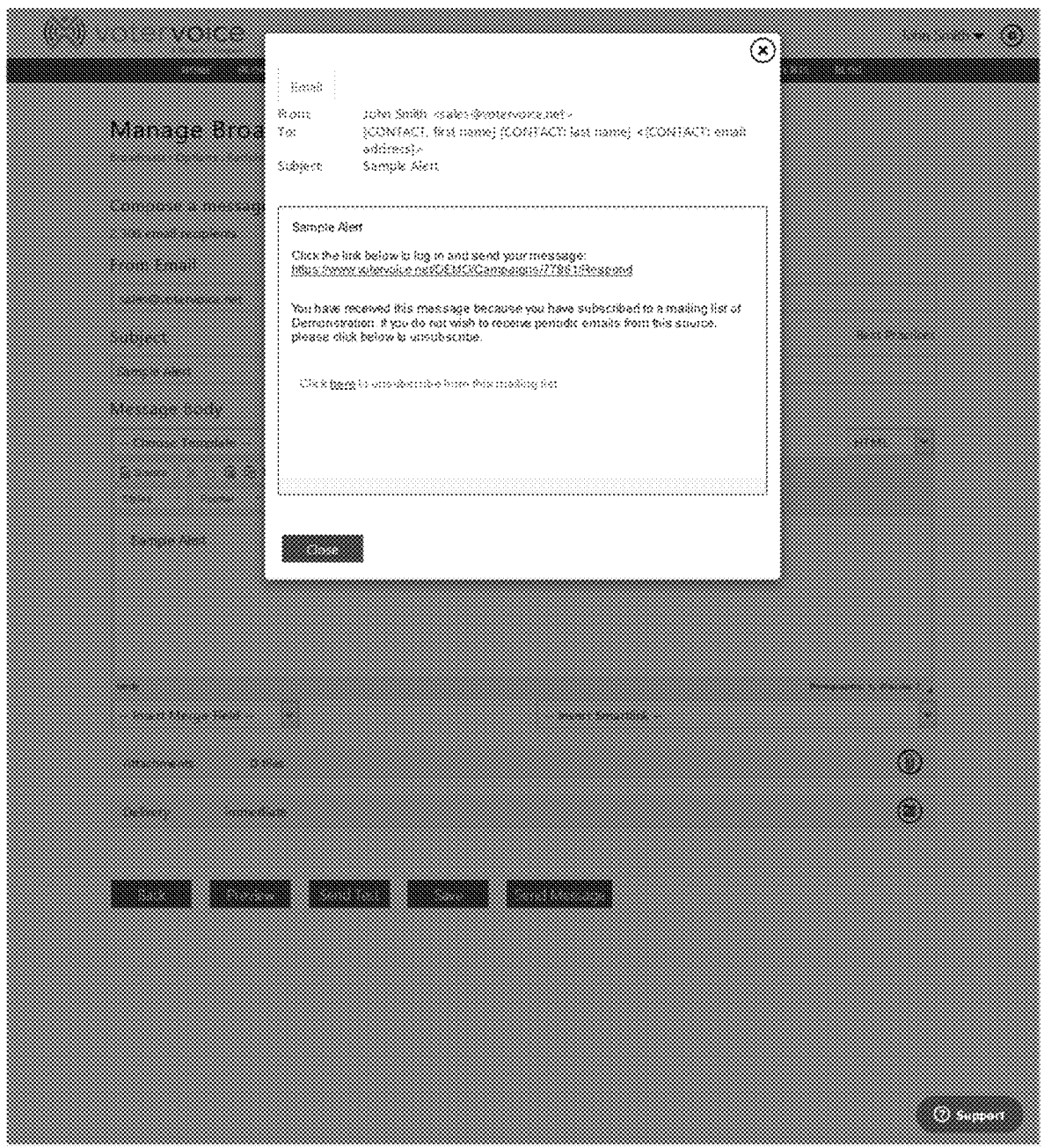
Figure 1M:
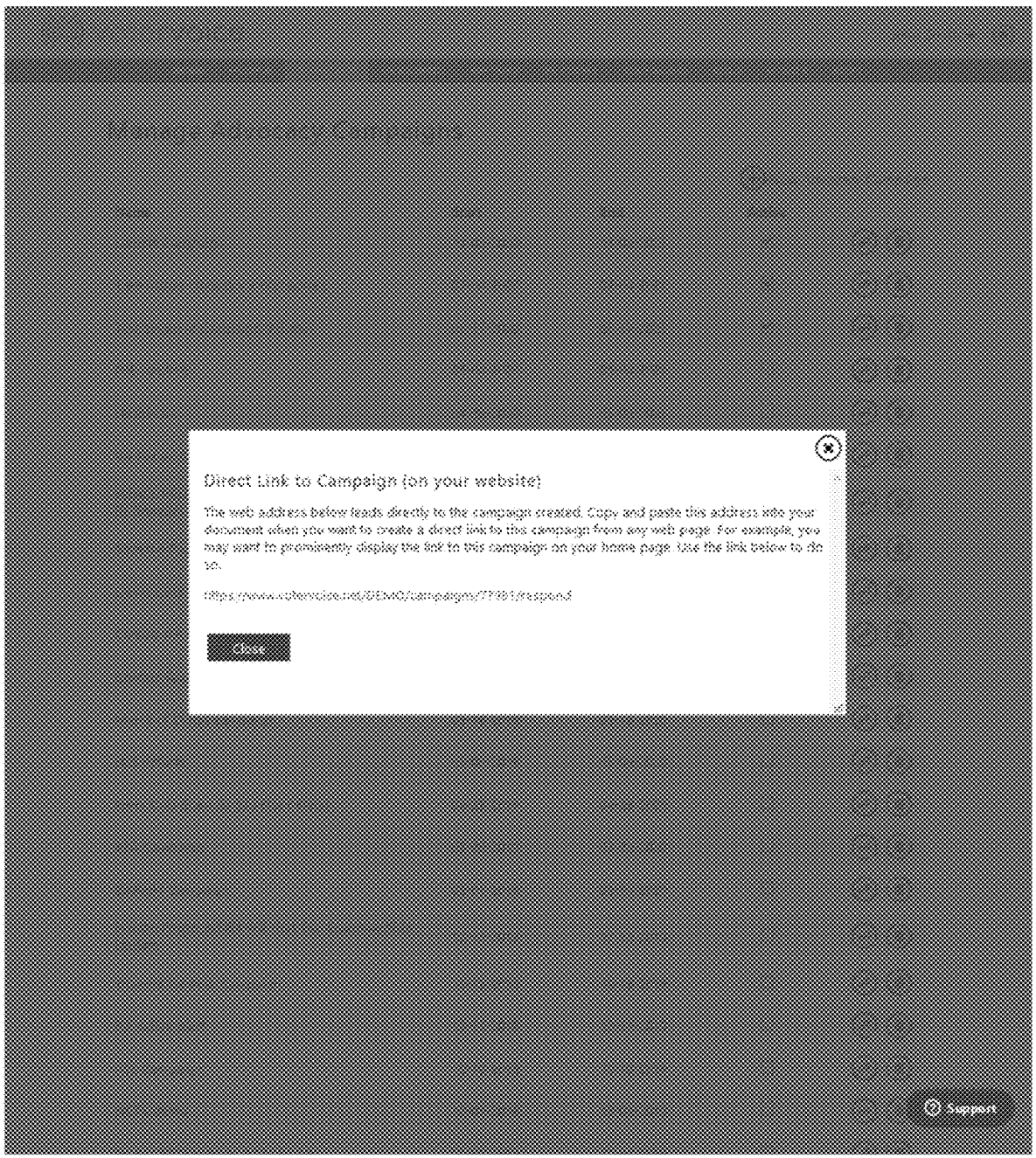

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

Terminology

The terms "based upon" and "based on" shall include situations in which a factor is taken into account directly and/or indirectly, and possibly in conjunction with other factors, in producing a result or effect.

The term "portion" refers to greater than none and up to the whole of a thing.

The term "advocacy organization" or "organization" can be any entity, such as a corporation, company, non-profit, association, partnership, interest group, individual, or a plurality of individuals or organizations, acting as a group using an advocacy system. An advocacy organization may have an advocacy objective, which can include, for example, causing legislation to be enacted in support of the organization's position on an issue, causing regulation to be modified according to the organization's position on an issue, raising societal awareness of the issue, gaining the support of a notable non-policymaking individual (e.g. a CEO), enlarging the organization's member base, or receiving financial support for the organization or in favor of the position. In order to achieve the objective, an organization will typically take action to inform targeted individuals about the issue or the position, which in turn may cause those individuals to take action as advocates on behalf of the organization.

The term "advocate" can include a person or group of persons that may be contacted by an advocacy organization to inform or take action. The advocate's actions can include, for example, contacting their legislative representatives with messaging supporting legislation consistent with the organization's position on an issue, providing financial support for the organization's positon, or even more generally becoming or being informed so that they might vote for elected representatives who would in turn support the organization's position.

The term "policymaker" can include a person or a group of persons involved in the process of law or policy making, whether elected or appointed (e.g. legislator, regulator, president, councilor, judge, a legislative chamber, a legislative committee, a regulatory agency, an attorney general, a state board of education, mayor, city council, a court). The term "policymaker" can also include a person or a group of persons who support other policymakers yet do not possess law or policymaking authority (e.g. assistants, staffers, lobbyists, consultants).

The term "policymaker record" can include a record of activity performed by the policymaker and can include all previous actions taken by a policymaker toward a given policy. The policymaker record can include sponsorship, votes, opinions, judgements, etc. by the policymaker associated with a particular policy.

The term "notable individual" can include a person or a group of persons that has standing/influence but is not a policymaker, (e.g. business executives, NGO's, think tanks, media organization).

The term "document" can include a discrete unit of unstructured textual information. Examples can include writings, articles, papers, e-mails, text messages, text input fields, bills, an regulations.

The term "message" can include a document that is transmitted to a recipient.

The term "policy document" can include a document that contains content that expresses an opinion on, has a bearing on, or a proposal for, a policymaking initiative. Policymaking documents can include legislation, regulation, social media posts, press releases, letters, lobbying disclosure, campaign contribution disclosure, news articles, etc. A document can be gathered online, scraped, etc., or input to the system by the user.

The term "characteristic" can refer to any describable, identifiable, or measurable property. A person, organization, document or message can each have one or more characteristics. For example, a person can have characteristics indicating their age, gender, profession, residency and party affiliation. An message can have characteristics indicating the time it was sent, its length, its text, whether it contains certain words, its formatting, such as font. An organization can have characteristics indicating its size, its function, its purpose, whether it is a non-profit. When a characteristic is considered with respect to its impact on an outcome, the characteristic can be referred to as a "factor".

The term "feature" can refer to an encoding of any measurable property or characteristic for processing by a computational model. A feature may be represented by the named property or characteristic and one or more associated values, where the values may be binary, discrete, continuous real number, and/or a vector of values. For example, a binary feature may represent the existence of the named property (e.g. organization has over 500 advocates), a discrete value may represent one or more categories (e.g. advocate is male or female), and a continuous value may represent a numerical value (e.g. advocate has a opened 25 e-mails).

The term "feature vector" can refer to a collection or array of one or more features that may be processed together.

The term "document feature vector" can refer to a feature vector representing one or more features of a document.

The term "message feature vector" can refer to a document feature vector where the document is a message.

The term "outcome" can refer to a measure indicating the performance of a particular advocacy campaign with respect to one or more metrics. An outcome can used to refer to performance with respect to a single message or message recipient. An outcome can be used more generally to refer to aggregate performance of an advocacy campaign with respect to multiple or all messages and/or recipients. An advocacy campaign can have multiple outcomes, each associated with different individual metrics or even combinations of metrics. Outcomes can be related sequentially/hierarchically, for example, the percent or proportion of total targeted recipients who open/read an advocacy request can be taken to be the total population for computing the percent or proportion for the action rate, specifically, the percent or proportion of targeted recipients who performed a given action of those who opened/read the request.

The term "delivery rate" represents the percent or proportion of targeted recipients who received the advocacy campaign request.

The term "open rate" represents the percent or proportion of total targeted recipients who opened/read the advocacy campaign request.

The term "action rate" represents the percent or proportion of total targeted recipients who performed a given action from the advocacy campaign request, where action may be, for example: visiting a website or online portal, signing a petition, sharing content on social media (twitter, LinkedIn, Facebook), opening form, submitting a form (e.g. regulatory comment, message to legislator), drafting an e-mail, sending e-mail, opening survey, sending survey, attending an event (e.g. hearing, webinar), submitting a donation, or signing up to a group.

The term "failure rate" represents the percent or proportion of total targeted recipients who unsubscribe, or fail to perform a given campaign request.

Advocacy Landscape

Organizations often wish to persuade an audience by instilling in them a given belief or desire to take a given action. In many real-world settings, an organization will use an online platform to contact an audience to complete an arbitrary action such as responding to a survey, purchasing a retail item, or performing political advocacy. Organizations interested in political advocacy may encourage an audience to inform or influence a policymaker or policy, such as by making a donation to a crowdfunding campaign or non-profit, contacting a local, state, or federal jurisdiction legislator to vote yes or no on a particular bill, becoming a member of an organization, or commenting on a regulation.

An online advocacy platform can be used to build and launch targeted advocacy campaigns that influence policymakers, policymaking, and notable non-policymaker individuals and organizations. Such a platform can be used to mobilize an organization's audience to generate messaging to a policymaker or notable non-policymaker. The messaging can include, for example, e-mails, postcards, petition signatures, phone calls, social media posts, web-based display advertisements, faxes, and text messages. Success can be measured, for example, by mobilization and engagement, such as numbers of advocates taking action, e-mails sent, regulations commented on, petitions signed, or donations made. Metrics can also include, for example, whether certain legislation is passed or defeated, and recruitment numbers of new advocates.

For any organization, the sheer volume of potential initiatives can create difficulty in identifying those that warrant advocacy. For example, hundreds of thousands of policies like legislation, regulation, news, and events, each of which might merit action, arise every year. Organizations generally have limited resources, whereas of the many potential initiatives to run campaigns, some are likely to be successful, while some are not, and so resources can be focused only on those more likely to be successful. Advocates have different levels of relevance (they may be more/less excited about an issue) patience (some can burn out or lose interest more quickly than others), and influenceability on policymakers (some advocates can be more influential than others).

Social psychology frameworks for understanding the characteristics of persuasion, such as the Elaboration Likelihood Model (ELM) theory (The Elaboration Likelihood Model of Persuasion, Richard E. Petty, John T. Cacioppo, doi.org/10.1016/S0065-2601(08)60214-2), argue that the set of factors that feed into successful persuasion can be broken into three groups: message, the text of the argument; audience; and speaker, the source of the argument. While marketing software exists that models text and audience characteristics independently, there is a need to consider them jointly.

In some situations, the speaker is a system user, the advocates are the audience, and the argument is presented from the system user to the advocates to perform a desired action. In some situations, the speaker is the advocate, the policymakers are the audience, and the argument is presented from the advocate to the policymaker to perform a desired action.

Since modeling the foregoing combination requires data about the speaker, audience, and argument, it is difficult to implement empirically. Often, we only have access to the observed outcome—did the persuasion succeed in motivating someone to take an action? Both the persuadability of the audience and the persuasiveness of the argument are often unobserved. There is, therefore, a need for machine learning models that can model a persuasive scenario as a function of latent variables describing the persuadability of the audience and the persuasiveness of the text.

While software exists to track policy, to draft/deliver/monitor messages, and to track opens/action rates, much of the advocacy process is still performed in a manual, labor intensive, and inefficient way. By way of example, to run an advocacy campaign, it is typically necessary to: identify the right issue to run a campaign on; identify the right set of advocates to target with the campaign; create the messaging for the organization to use for contacting the advocate to maximize desired likelihood of advocate performing desired activity; help advocates craft message to send to policymaker to maximize the likelihood of desired outcome from policymaker for the user; identify the right set of policymakers to target with the campaign; and measure the effectiveness of efforts. There is currently limited functionality in existing systems to generate personalized user to advocate or advocate to stakeholder messages. For example, existing software may provide the ability for an organization to have one or more prewritten templates, or to only select one or a few out of a number of predetermined or pre-written options. What present systems do not provide is the ability to combine part predetermined message with part dynamically generated content derived through automated analysis of the history and/or interactions of users, advocates, and/or policymakers.

System Overview

The present disclosure relates to systems and methods that can be used by organizations or individuals to effect political advocacy. Machine learning techniques can be used to analyze structured and unstructured data/interactions in order to enhance the effectiveness of persuasive communication within a web-based advocacy system. Such enhanced efficacy enables organizations to better manage campaigns that can be used to inform advocates of issues and to facilitate efforts by those advocates to support the organizations' goals with respect to the issues.

Figure 2A:
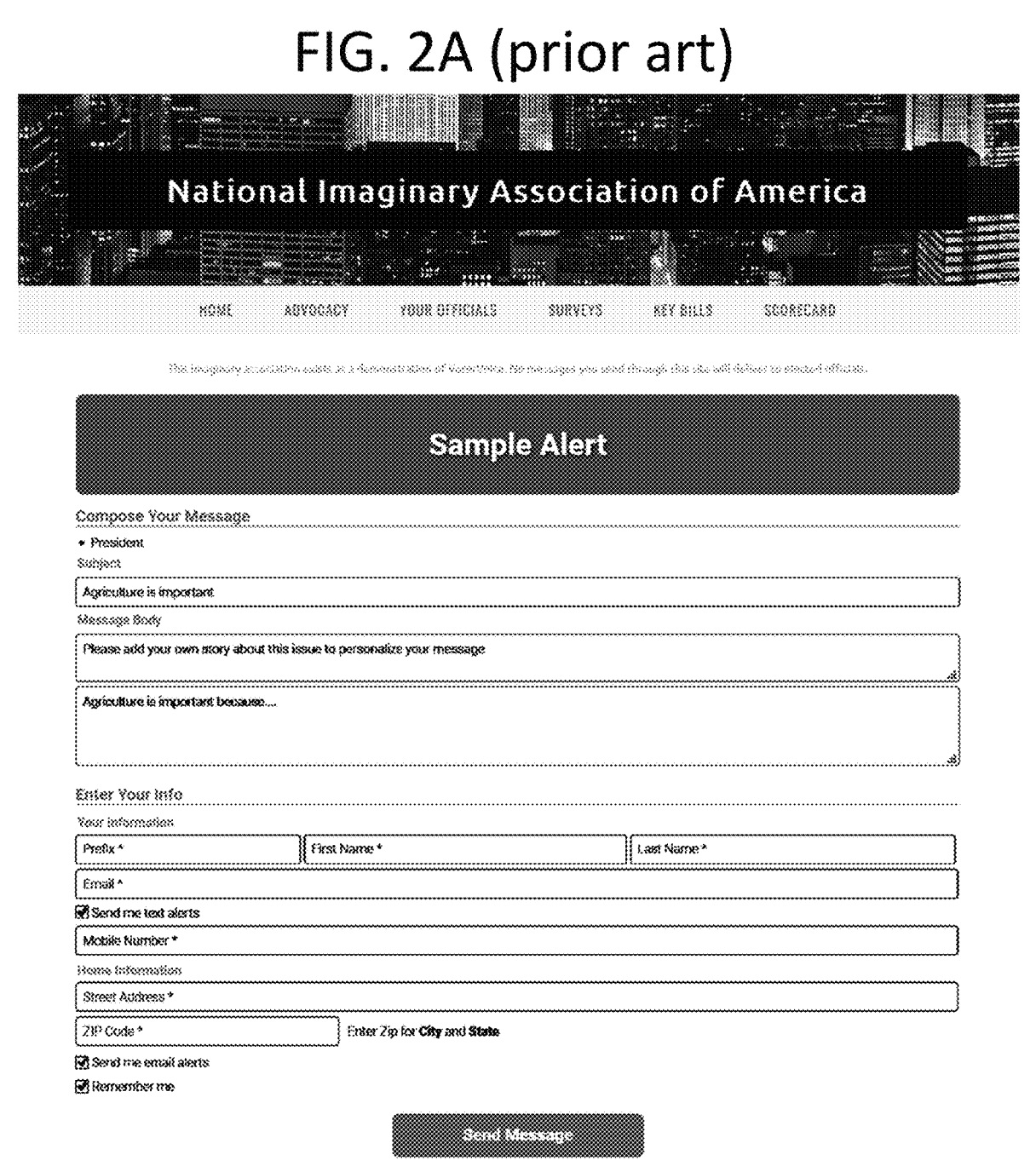
Figure 2C:
Figure 3A:
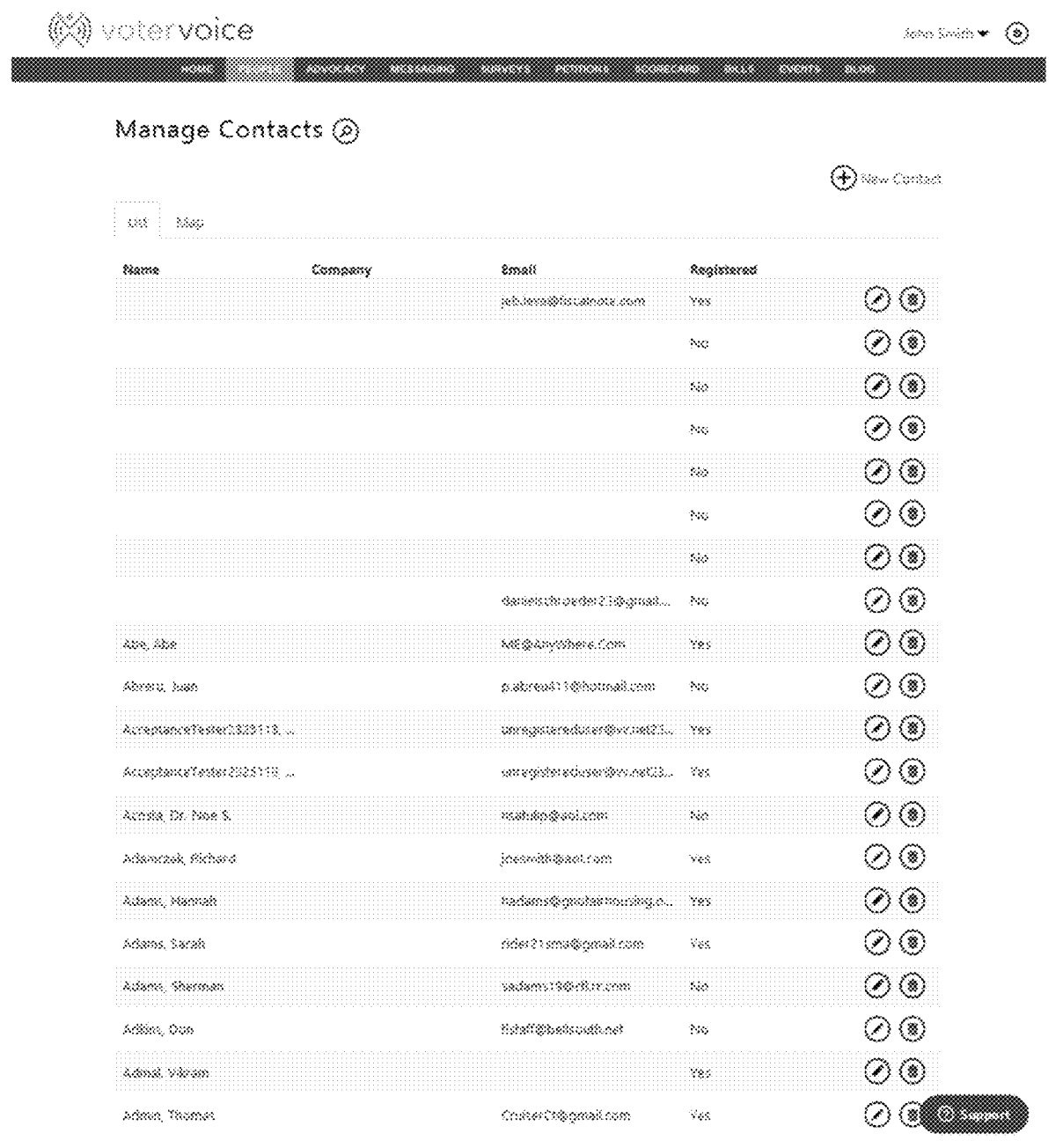
Figure 3B:
Figure 3C:

The disclosed systems and methods can be implemented, for example, by building upon or leveraging prior art advocacy systems, such as the VoterVoice system as described above with reference to FIGS. 1-3, as an underlying platform or framework. The disclosed systems and methods can alternatively be implemented using various other platforms, such as web-based, cloud based or workstation based platforms, including any combination of applications and/or services.

A disclosed web-based advocacy system enables organizations to manage campaigns that can be used to inform advocates of issues and to facilitate efforts by those advocates to support the organizations' goals with respect to the issues. An organization using the advocacy system will have an account on an advocacy software application, and through the application it can create and manage individual advocacy campaigns. In a typical scenario, an organization's user will create a campaign that can be used to generate a message to each advocate of a selected set of advocates. The messages may be delivered, for example, via e-mail, postal mail, phone text messages, phone calls, web-based display advertisements, and/or social media posts. Each message may request that the advocate, in turn, access a site, such as a website hosted by the system, a social media platform, a site hosted by the organization, and perform a requested action. The requested action may include the advocate sending a message advocating the organization's position to one or more advocacy targets, including policymakers, policy documents, or notable non-policymaking individuals and organizations, such as CEOs or think tanks through, for example, a site hosted by the system, social media platform, site hosted by the organization, and/or sms/text messages, or phone calls.

Figure 4:
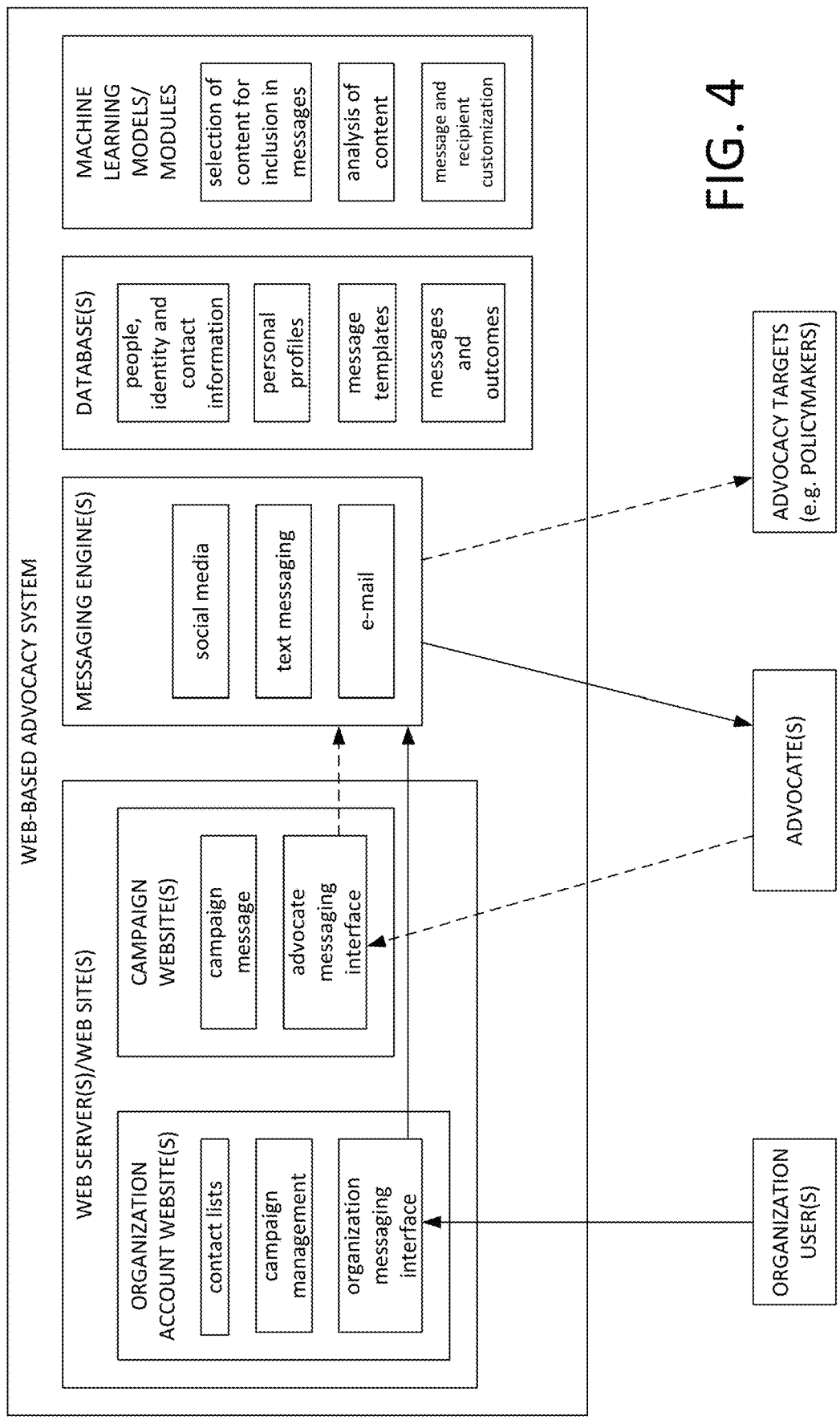
FIG. 4 illustrates a functional block diagram of a web-based advocacy system that leverages machine-learning models to create messaging for advocacy campaigns.

FIG. 4 illustrates a functional block diagram of a web-based advocacy system that leverages machine-learning models to create messaging for advocacy campaigns. The system can be used by an organization user, who may be a member, employee, or representative of an organization using the system to implement an advocacy campaign. The system can also be accessed by, used by, and/or communicate with individual advocates, each of whom may be any individual the organization is seeking to interact with in the course of an advocacy campaign. The system can also be accessed by, used by, and/or communicate with individual policymakers, such as government executives, legislators, or regulators whom the organization is seeking to influence.

The system can include one or more web servers that operate one or more web sites through which users and/or advocates can interact with the system. The web sites can include an organization account website for each organization using the system. The organization account website can be secured by an account login and can be used by an organization's users to create and manage advocacy campaigns. The organization account website can also support the creation and management of contact lists of the organization's advocates as well as the creation and management of advocacy campaigns. The organization account website can also include an organization messaging interface through which messages for an advocacy campaign can be created and sent or broadcast to selected advocates. The messaging interface can be configured to support the creation of message templates and the selection and/or filtering of advocates or contacts to whom messages are sent in an advocacy campaign.

The system can also operate a campaign website, which can be used to deliver the organization's message for a particular advocacy campaign to its advocates. The campaign website can also support an advocate messaging interface, which can be a web-based interface through which advocates can create and send messages to policymakers through the system.

The system can include a messaging engine that includes logic and functionality for sending and/or posting messages for advocacy campaigns. The messaging engine can include, for example, an e-mail server for sending e-mails, a text server for sending text messages, a phone dialer for making phone calls and/or delivering voice messages, and social media interfaces for posting messages to social media websites or other websites that can be used to deliver a campaign message or alert.

The system can also include a database, which can be one or more databases that are used to store information and data relating to user organizations and their advocacy campaigns. The database can store identity and contact information, such as name, e-mail, phone, and address for various people with whom the system interacts, such as users, message senders, advocates and policymakers. The system can also maintain personal profiles for the various people with whom the system interacts. The personal profiles can be configured to store any personal information or data characterizing the people, such as biographical details, demographic details and custom tags. Components of such personal information or data will also referred to herein as facets or items of personal information.

Custom tags can be used to characterize a person in a descriptive way such as, for example, liberal, conservative, pro-choice, or pro-life. Any number of custom tags can be assigned to a person manually (by themselves or by others) or automatically. Custom tags can be assigned automatically by analyzing prior interactions by the system with people and/or by performing automated analyses of proprietary or publicly available data about and/or posted by the people, such as messages sent through the system, social media web postings, public information, voting records and/or credit records.

The databases can also store message templates for use in sending or broadcasting messages to advocates and/or policymakers. A message template can include various merge fields and/or logic for incorporating data about message senders and/or recipients into actual messages to be sent. Message templates can be created, for example, by system administrators or by organization users for use in individual or across multiple advocacy campaigns.

The database can also store records of individual messages sent to advocates and/or policymakers along with outcomes or results of the sending of those messages. Each message can be associated with an individual sender and/or recipient of the message. The message record can also be associated with or store the outcome or result of sending the message. The outcome or result can indicate any one or more of, for example, whether or not the recipient read the message, whether or not the recipient took a specific action or actions requested in the message (such as using the system to send a message to a policymaker and/or making a financial contribution), or that no outcome or result was recorded. The outcome or result can involve external factors determined, retrieved or input separately from the system's direct interactions with the message recipient. For example, in the case of a message from an advocate to a policymaker, the outcome could indicate how the policymaker subsequently voted on a piece of legislation. The policymaker's vote can be obtained either by the system using automated processes or input into the system, possibly by manual or automatic action at a later date.

The solid arrowed lines in FIG. 4 illustrate interactions and information flows when an organization user sends a message to one or more advocates. In particular, the user can use the organization messaging interface to create an alert message to be sent to a selected set of advocates. The information supplied through the organization messaging interface is passed on to the messaging engine, which in turn sends the message to the recipient advocates. The recipient advocates may receive the message, for example, by e-mail, text message, or social media platform. A recipient advocate, upon receiving the message, can then select a link in the message which takes the advocate to the campaign website.

The dashed arrowed lines in FIG. 4 illustrate interactions and information flows when an advocate sends a message to a policymaker in response to receiving a request from an organization user. In particular, upon arriving at the campaign website, the advocate can be presented with an option to create and/or customize an advocacy message to be sent to a selected or predetermined policymaker by the advocate through the system. The advocate completes a web form in the advocate messaging interface in response to which a signal is sent to the messaging engine, which then sends a message to the advocacy target (e.g. policymaker). The messaging engine can optionally submit the message to another site, to an API, generate text messages, or use a fax service. The messaging engine can be configured to monitory success/failure of delivery. If message delivery is unsuccessful, a certain number of automatic redelivery attempts can be made.

The system can be configured to aggregate advocacy organization, policymaker and advocate information from a plurality of data sources and represent it in machine readable forms. The data sources may include publicly available and paid repositories of policy documents, policymaker, organization and advocate information. Data sources may be maintained by government, non-profit, or private entities that make the data available for retrieval. Data may be retrieved in accordance with known methods, including scraping, crawling, API interfaces, and direct file access (e.g. through FTP, S3, etc.). Data sources may include proprietary data collected from a system user, i.e. organization, and/or advocate, and/or policymaker. Proprietary data may be retrieved in accordance with known methods, and/or directly added to the system. Each piece of information from a data source may be represented by a feature and aggregated along with other information into a feature vector.

The system can include an aggregation engine configured for aggregating org/policy/policymaker information. The aggregated information can include metadata, and it can be aggregated periodically/on demand, stored in a database. The aggregation engine can be implemented as an software module integrated with the system or as separate software and hardware.

Data sources can provide structured, semi-structured, or unstructured information. Features can be derived from structured information, such as structured relational database records of website transaction records. Features can also be derived from semi-structured information or unstructured information, such as documents, that the system converts to a machine analyzable form.

The system may be configured to convert documents into one or more structured representations, such as document feature vectors. Features representing the document can be calculated based one or more units of text associated with the document, such as words, phrases, or a combination thereof. For example, a feature may be a specific word, phrase, or combination thereof. Furthermore, features may be calculated from and associated with a subset of or all of the text, such as sentiment, stance, part-of-speech, grammatical structure, subjectivity, reading compression level, and the like. Features may also be metadata associated with or derived from the document, such as author, date, etc. Features may be computed and extracted from the text utilizing known natural language processing algorithms, as implemented in Spacy, OpenNLP, NLTK, and the like. For example, algorithms for tokenization, part-of-speech tagging, and sentiment may be applied using known rule-based or machine learning techniques.

The system can be configured to compute values for features derived from documents. Features can be binary valued, for example the value of 1 representing the occurrence of words, phrases, or combinations thereof, and the value of 0 representing the non-occurrence. Features can have a discrete value, for example a ternary value indicating whether a word has a positive, negative, or neutral connotation. Features can have a continuous, real value, for example representing a weighting associated with the frequency or importance of words or phrases. A weighting can be calculated, for example, based on the frequency of occurrence of a feature within a given document (e.g. the value of the feature may be higher if it occurs more frequently within the document), or across a plurality of documents (e.g. the value of a feature may be higher if it occurs less frequently across documents). Features representing a word, phrase, or a combination thereof may themselves be represented by a multi-dimensional vector. For example, known natural language processing (NLP) algorithms utilizing neural network architectures for calculating contextualized word embeddings, such as BERT, can be used.

Advocacy organization feature vectors may include background information about the organization such as: organization name, locations(s), employee names, revenue amount, fundraising activities, industry classifications (e.g. SICS, NAICS, GICS), member base size, contributors, contributions, and position/policy statement. Advocacy organization feature vectors may also or alternatively include information derived/computed from an organization's interaction with the system such as: number of campaigns, number of advocates, and relevant issue labels.

Advocacy campaign feature vectors may include information derived from individual campaigns and messages such as: title, organization, locality targeted, campaign topic/issue(s), associated policy document(s), number/demographic distribution of advocates contacted, type of action or action type requested (e.g. advocacy, survey, event, petition, donation, etc.), action medium (e.g. e-mail, web, social, phone), message(s) sent, datetime metadata (time of day sent, day of week sent, etc.), length of e-mail subject, length of message, number of links, position of links, style and content features of message content, performance metrics: visitors to website, sent messages opened, message click-through/action rate, and form submission rates.

Advocate feature vectors may include background information about the advocate such as: advocate name, location, and other demographic characteristics (job title, salary, gender, age, voting history, donation history, political identification). Advocate feature vectors may also or alternatively include information derived/computed from advocate interaction with the organization and/or the system such as: advocacy campaigns participated in, messages received, and messages sent.

Policymaker feature vector may include background information about the policymaker such as: policymaker name, jurisdiction represented, policy documents, policy actions/record, and contributors.

In accordance with the disclosed embodiments, as will be described in additional detail below, the system can include functionality for creating, training, and using machine learning models to perform various functions in the advocacy system. As will be described in additional detail below, for example, machine learning models can be configured to customize advocacy messages by selecting content for inclusion in individual messages to advocates and/or policymakers based on message templates.

Analytical, mathematical, and/or machine models may be built to perform automated analysis of user/advocate/policymaker history/interaction. A model may be created using rule-based, statistical, or machine-learning based methods, processes or algorithms. A model may be trained using a training set composed of input and output pairs (pairs of inputs and outputs).

Inputs can be presented to a training algorithm as one or more feature vectors. These feature vectors can include, for example: a feature vector representing the advocacy organization (e.g. an organization feature vector), a feature vector representing the advocate (e.g. an advocate feature vector or a personal profile feature vector), and/or a feature vector representing a message from the organization to the advocate (e.g. a message feature vector). The one or more feature vectors can be aggregated and provided to the model as a single feature vector, they can be provided as separate feature vectors, or the components can be provided to the model as individual inputs.

Outputs can be represented as an outcome, such as a binary indicator, a probability, a prediction, or a label assignment representing whether an advocate performed the requested action in a message. For example, an output can indicate whether or not an advocate clicked on a link or whether or not they contacted a policymaker.

A model may have weights associated with a plurality of features based on analysis of the training data, where the weights may represent a strength of the correlation of the input feature with the output, based on the training data. A trained model may output a prediction (such as a predicted outcome) along with a confidence or likelihood associated with the prediction. Any number of known machine learning methods, processes or algorithms may be used to compute the model, including, for example, linear regression, support vector machines, neural networks, or a combination thereof. A model may be composed of an ensemble of other models, where the outputs of previous models are used to train and/or produce an output for a subsequent model.

Analytical, Mathematical, Machine Learning Models and Modules

Figure 5:
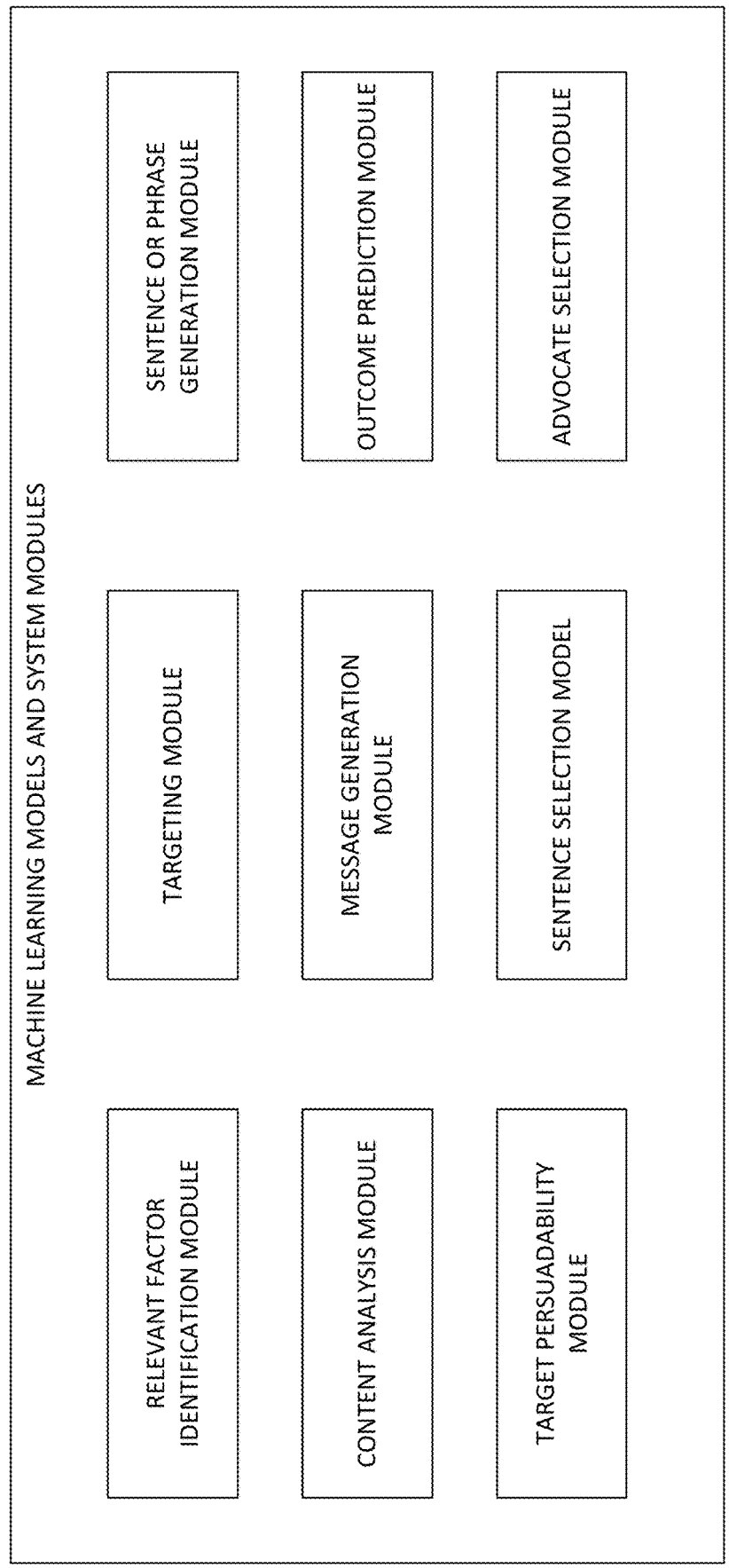
FIG. 5 illustrates a collection of analytical, mathematical, machine learning models and modules any one or more of which can be included in the system for use in creating effective messages to recipients.

FIG. 5 illustrates a collection of analytical, mathematical, machine learning models and modules any one or more of which can be included in the system for use in creating effective messages to recipients. The modules can include, for example: a relevant factor identification module, a content analysis module, a target persuasiveness module, a targeting module, a message generation module, a sentence selection model, a sentence or phrase generation module, an outcome prediction module, and an advocate selection module.

A relevant factor identification module can be configured to identify relevant characteristics, also referred to as factors, for customization of messaging using a training set of historic data. The historic data can include, for example, advocacy organization, advocacy target (e.g. policymaker, policy documents, notable non-policymaker), advocate, and/or advocacy campaign data or a combination of one or more thereof. A relevant factor identification model can be trained to predict the likelihood of a given desired outcome using the historic data. The model can be configured to produce scorings, weightings, and/or likelihoods relating to inclusion of individual factors or combinations of factors of advocacy organization, advocacy target, advocate, and advocacy campaign data with certain outcomes of sending messages. Outcome metrics can be normalized or adjusted to account for various effects (e.g. seasonality, industry, advocate population).

The relevant factor identification model can be based on advocacy campaign data, such as datetime (e.g. time of day, day of week) trained using known machine learning algorithms. For example, from historic data representing previous interactions with the system, the model can be configured to learn a correlation that advocate A is five times as likely to take a given action if they received the request between 8 am and 9 am on a Monday as any other time, while advocate B is twice as likely between 7:30 pm and 9 pm on Thursday. The system can be configured to personalize requests using this model to advocate A by sending requests Mondays between 8 am and 9 am, while sending the same request to advocate B between 7:30 pm and 9 pm on Thursday.

A content analysis module can be configured to analyze message content to identify relevant portions of a message. Relevant portions can be spans of data that are semantically identifiable and can be correlated with a desired outcome. The content analysis module may be executed by a model composed of the application of rules, defined by a user or administrator of the system, which when applied to the text identify and annotate relevant portions. For example, rules can be configured for identification of links, punctuation, elements of discourse structure (e.g. syntax), policy information (policy document identifier, indicating for/against position), personal information (e.g. name, profession, location, etc.), numerical values (e.g. monetary amount, dates). Identification of relevant portions can include indicating the presence of a given type of content matching a rule, the number of occurrences, and the location of the occurrences. The relevant portions identified, along with their location, frequency, etc. can be stored as metadata associated with the message in a database and used to construct one or more feature vectors.

The relevant factor identification model may be based on or receive input from the content analysis module. For example, from historic data representing previous interactions with the system, the models may learn a correlation that the action rate is 50% over all advocates when a link to a web form appears at the top and bottom of an advocacy request. As another example, the models may learn that advocate A is 2 times as likely to take a given action if there is one link to a web form at the top of the request message, while advocate B does not take an action unless his nickname is used in the greeting and link appears at the bottom. Using the models, the system can be configured, for example, to personalize requests to advocate A by sending requests with a single link at the top, while sending the same request to advocate B with a link at the bottom.

The content analysis module may be implemented using a statistical and/or machine learning model. The trained statistical/machine learning model may be used to identify and annotate relevant portions of documents such as messages. Applicable models can include, for example, known machine learning syntactic parsing models, coreference resolution, named entity recognition models, and discourse structure parsing models. The content analysis module can also or alternatively be implemented using a combination of rule-based and machine learning based models.

Relevant portions of documents may be separated into components of several style and content representations, with additional categories included for argument quality and task specific properties. Style features represent higher level properties of words and rhetorical structures (e.g. is the text analytic or authentic?). Style features may be derived from pre-built lexicons such as, for example, the Linguistic Inquiry and Word Count (Pennebaker et al., 2015), a lexicon of 93 metrics ranging from parts-of-speech to thinking styles to emotions; Valence, Arousal, Dominance (Warriner et al., 2013); Concreteness (Brysbaert et al., 2014); Argument features (Somasundaran et al. 2007) including {necessity, emphasizing, desire, contrasting} and rhetorical question; the NRC Lexicon: Word-level level associations for emotions like anger, disgust and fear (Mohammad and Turney, 2013); Sentiment and Subjectivity: as implemented in the TextBlob Python Library; urgency indicator features, based on a custom list of words indicative of high urgency and timeliness (e.g. "soon", "now", "hurry").

Style features can be derived using machine learning models. For example, a multi-class classifier can be trained to recognize "emotional", "logical" and "credibility" appeals. The content analysis module can use the classifier at the sentence level to indicate whether the sentence contains an emotional, logical, or credibility appeal. As another example, text quality may be assessed by training a machine learning model, such as BERT, using the MACE-P score, and the model can be applied to individual sentences in messages. The output of the classifier can be stored alongside the message, for example as the average and the sum of the scores across the sentences. Content features can be used to represent the text directly. Text can be represented in a document feature vector. For example, the feature vector may be use TF-IDF bigrams values to represent the text. Alternatively, the feature vector may use deep, contextual text representations, for example from BERT.

The relevant factor identification module may use a plurality of relevant portions identified by one or more content analysis models described above. For example, from historic data representing previous interactions with the system, the model may learn a correlation that advocate A responds only to messages containing an emotional appeal when the requested action is for a donation, but responds to messages requesting contacting a legislator only when there is a strong sense of urgency.

The system can build a model of the interaction between the advocacy organization, advocacy target (e.g. policymaker, policy documents, notable non-policymaker), advocate, and/or advocacy campaign data or a combination of one or more thereof using a standard machine learning algorithm, such as logistic regression, SVM, or a neural network.

The system can model interactions as a function of latent variables describing the persuadability of the audience member (e.g. advocate, policymaker, notable non-policymaker), and the persuasiveness of the message and organization, allowing the system to learn a separate latent representation of the message, speaker (e.g. organization) and audience (e.g. advocate, policymaker, notable non-policymaker). For example, Item Response Theory (IRT), a framework for modeling the interaction between latent traits and observable outcomes may be used. These models are frequently used when an outcome is observed, but the factors predicting that model are unobservable. For example, in education an outcome could be a student's answer to an exam question, and the latent predictive traits are a student's knowledge and the difficulty of the question; in politics an outcome could be a vote on a bill and the unobservable traits are the legislator's and bill's ideology. An IRT model provides both a prediction of the outcome, and an interpretable measurement of the latent variables. In applying IRT to persuasive communication, the audience has a response to the item, where the item is an argument composed of the speaker and message.

A Rasch parametrization of an IRT model may be used. Using the education domain as an example, in it the probability that an individual i answers test question j is given by:

$$p(y_{i,j}=1|\alpha,\beta)=\sigma(\alpha_i-\beta_j)$$

where $\alpha_i$ represents a respondent (e.g. a student's ability) and $\beta_j$ represents the item (e.g. the difficulty of a test question). Intuitively, if the ability is greater than the question difficulty, then the student will answer the question correctly. Given a series of exam sessions one can estimate values of a and for all of the students and questions in the dataset. This can be done using a variety of optimization strategies, such as Expectation Maximization or Bayesian techniques.

One limitation of the foregoing approach is that it cannot be used to perform inference on new test questions because all parameters are estimated simultaneously. Thus, in practice a linear logistic test model that parameterizes the difficulty, as a weighted linear combination of test features may be used. In this formulation, the student a remains a latent variable, but the of an unseen question can be predicted using attributes of the question itself. The parameterization used to predict the item parameters is a weighted linear sum of features:

$$\beta_j = \sum_{k=1}^{K} w_k * \psi_{jk}$$

where $\psi_k$ is an input feature representing the item, and $w_k$ is the associated weight learned during model training.

To apply this model to persuasion, specifically advocacy, requests are considered as follows. First, arguments can vary in quality, similar to test questions having different difficulty levels. Second, the quality of an argument is based only on how the audience reacted; similar to how a student's ability is measured via how well they performed. Third, it is possible that a good argument is matched with an audience reticent to persuasion, similar to a good student receiving a particularly hard question. The latent argument parameter can be modeled as a function of attributes of the argument itself, thus allowing the model to include attributes of the speaker and text in the model directly.

A two parameter generalization of an IRT model can be used as follows:

$$p(y_{i,j}=1|\alpha,\phi,\beta)=\sigma(\alpha_i \cdot \phi_j - \beta_j)$$

where, $\alpha_i$ represents the respondent (students ability), and $\beta_j$ is the item's difficulty, but now $\phi_j$ represents the item's discrimination. The key difference of this framework is that through the discrimination parameter, it allows the possibility that some questions are better than others at allowing observation of the students true latent ability. In the case of persuasion, this corresponds to some arguments being better at persuading than others. The two item parameters, $\beta_j$ and $\phi_j$, can be estimated as linear functions of features.

This framework has commonly been be used to explain legislator voting behavior. In this case, the response $y_{i,j}$ is a vote by respondent i (a legislator) on item j (a bill). Clinton et al (2004) show that the parameter $\alpha_i$ can then be interpreted as the respondent's ideology (e.g. negative values are more liberal, positive values are more conservative); $\phi_j$ is referred to the bills polarity (i.e. discrimination); $\beta_j$ represents the bill's popularity (i.e. difficulty). Thus, if $\alpha$ and $\phi$ share the same sign, then the intent of the bill is aligned with the legislator and they will likely vote yes. $\beta_j$ provides an additional level of expressiveness to represent policies that everyone would support. The features representing the organization, advocate, advocacy request can be provided as inputs to $\phi$ and $\beta$.

Once a Rasch or a 2PL model is fit, the learned a can be interpreted as a one-dimensional respondent embedding. In the legislator voting context, these values can be interpreted as ideologies: legislators with very negative or very positive embeddings reflect very liberal and conservative stances, respectively, while those with small-value embeddings map to moderate legislators. While interpretation of these values will depend on the task, in general, similar embeddings will map to similar audience members and can be grouped together for further analysis. The embeddings and weights generated by the model can be analyzed separately for further insights. For example, the distribution of audience embeddings ($\alpha$) can be compared and interpreted as advocate reticence to being persuaded to take a given requested action. In some embodiments, according to this analysis, the more reticent an advocate is, the more personalized an advocacy request made by the system will need to be (the more it deviates from the standard template) to be successful.

The system can be configured to separate the representation of the argument from the Audience. For example, the system may identify features which predict whether audience responds, separately from whether argument is popular overall. As another example, system may analyze how different audience members respond to the same argument. A model can trained across organization and advocate responses. For example, if the personality type (e.g. Myers-Briggs) indicator is known for an advocate/policymaker/notable individual, the system can compute correlations between personality types and relevant portions.

A target persuadability module can be configured to construct a representation of factors correlated with a given advocate/policymaker/notable individual performing a desired or requested action. The representation may be constituted by features that are weighted low/highly from the relevant factor identification module, such as specific style, quality, content terms, and location/frequency of elements like links/punctuation. The target can be represented as a feature vector of the selected features along with their respective weights. A latent variable can be associated with the target, computed by a latent variable model, such as Rasch or 2PL.

Training data for a model can include all organization data, advocacy requests, and advocacy pairs, with one model being trained based on the entirety of the training data. Alternatively, a subset of the training data can be used to build one model per organization and advocate pair. Multiple subsets of constructing training data and building an associated model can be implemented, including for example: one or more models per organization and advocate pair, one model per advocate across organizations, one model across organizations in a peer group, where a peer group may be defined, for example, as an industry, locality, size, or issue set. One model can be learned per action type and/or one model can be constructed across all action types. As noted above, action types can include, for example, advocacy, survey, event, petition, donation, etc.

The system can be configured to compare performance measures of its campaigns to various subsets for an organization. For example, the comparison may be computed, for example, over all previous campaigns of an organization of a given action type/performance measure, over all organizations, over all organizations in given peer group (industry, size, locality), over all selected/similar issues, or over all similar issues across organizations. Relevant factors associated with all or a subset of the various subsets above can be shown to the user. For example, the system can be configured to present to a user: an aggregate view of advocate demographic factors correlated with successful campaigns, relevant portions of content in successful campaigns (e.g.— emotional, credibility appeals, concreteness, logical appeal, word count).

A targeting module can be configured to identify characteristics of high performing advocates based on correlation with features described above. High performing advocates may be identified across various subsets (e.g. action type, locality). The system can be configured to present, display or allow user selection of these characteristics in a user interface.

The system can be configured to provide recommendations to the user based on relevant factors. For example, the system can be configured to present to a user indications of when to send a message or how many links to include in the message.

A message generation module can be configured to generate the content of an advocacy request or message. The message generation module can be configured to use a message template to generate natural language text content for a new message to a target recipient by merging one or more facets of obtained from the target persuasiveness module into corresponding merge fields of the message template. For example, if the message template contains a merge field for a profession, and the learned representation of an advocate identifies the presence of their profession to have a positive effect on their performance of the requested action, the advocate's profession can be merged into a corresponding field. On the other hand, if the learned representation indicates that the presence of the advocate's profession in the message is learned to have a negative effect, the system can remove the merge field and delete appropriate parts of the template that are unnecessary without the presence of profession.

The message generation module can be configured to parse a template created by the user, identify content that corresponds to a relevant portion for a given advocate, and determine locations of occurrences. The message generation module can be configured to suggest to a user the creation or removal of message content. The message generation module can alternatively generate messages without user intervention. For example, the message generation module can be configured to determine the removal of a second link at the bottom of a message, the insertion of a name field or party field in place of a referential pronoun, or the insertion of an emotional appeal adjective, or urgency word.

The message generation module can be configured to construct phrases or sentences to insert into a message. The module can be configured to access a knowledge base or template of prewritten sentences to choose from. The module can be configured to access policy documents associated with advocacy requests.

The message generation module can include a sentence selection model trained to select salient sentences from knowledge base/policy documents that include portions identified as relevant to the advocate (e.g. monetary amounts, dates, impact study). Extractive sentence selection may be performed, using known NLP methods, where phrases/sentences are extracted from policy documents to be inserted into the message. Abstractive sentence selection may be performed, using known NLP methods, where phrases/sentences are first extracted from the policy documents, then a sentence generation module receives those selections as input and produces one or more new phrases/sentences based on those selected, and these generated phrases/sentences are inserted into the message. A phrase/sentence may be generated without reliance on a preexisting knowledge base or policy documents, using known natural language generation models using relevant factors of the advocate/organization/policymaker. Known language generation methods can be used, including pre-trained neural language models, such as BERT, XLNet, or GPT-3 that may be fine-tuned on the advocacy message content or policy documents.

The system can be configured to receive a user selection of an action type (e.g. advocacy, survey, event, petition, donation) for an advocacy campaign. Alternatively, an action type model can be used to determine or suggest to a system user an advocacy communication type for a campaign. An action type model may be a rule-based or machine learning model built using the organization, message content, etc. as features.

An outcome prediction module can be configured to produce a baseline prediction of an outcome metric or score using the initial user specified settings, including the template and user supplied target list, as described above. The outcome prediction module can also be configured to generate an optimized prediction of the outcome metric or score using the output of or configurations based on one or more of the modules as described above. The system can be configured to compare or present to the user a comparison of the optimized prediction and the baseline prediction of the outcome metric or score. Depending on the result of the comparison the system or the user can select to use a baseline configuration or the optimized configuration. The comparison can also be used to provide the system or user feedback for further modification or configuration of a campaign. In some embodiments, the difference in the outcome metrics or scores of the baseline and optimized configurations can be compared relative to a minimum threshold, and only if the threshold is exceeded is one determined to be preferable to another. The threshold may be specified by the system user, set by the system to a default threshold setting, set according to an organization's previous campaign activity, or set according to a plurality of system users' previous campaign activity.

An advocate selection module can be configured to use a rule-based, statistical, or machine learning model to generate a probability/likelihood of advocate performance for inclusion of advocates as targets in a campaign. In one embodiment, a statistical model can be used to compute correlations of advocate information (e.g. demographics, policy interests) with a desired output using historical data to identify characteristics of high performing advocates. Historical data may be from all or a subset of previous campaigns (e.g. same locality, same topic, and/or same policymaker). For example, a statistical model may compute that an advocate has an open rate of 85% across all campaigns, 90% action rate on campaigns targeted against Senator Smith, and has donated $0. The model may assign the advocate a score of 85 for open, 90 for campaigns related to Senator Smith, and 0 for donation.

The advocate selection module can be configured, for example, to include all advocates scoring above a specified threshold as targets. Advocates can be automatically removed from a target list if outcome success probability is predicted to be below a certain threshold. This threshold can be specified by the user and can be made absolute or relative to a peer group or the advocate's historical success probability. For example, if historical data indicates that John has a 1% response rate when an issue is related to the "Deforestation" topic, relative to his average response rate of 15%, then the advocate selection module can be configured to automatically remove him. Similarly, if the threshold response rate is set at an absolute 10%, the system may automatically remove him.

The advocate selection module can be configured to use a trained machine learning model to generate probability/likelihood of a successful advocate in response to a campaign. The training data may include advocate information paired with the output of an advocate's performance across a plurality of outcomes. For example, the scores computed by the statistical model referenced above may be used as the output to train a machine learning model. The model may be applied to a new advocate without prior interaction with the system to assign a probability/likelihood of advocate performance across desired outcomes. New advocates scoring above a specified threshold may be suggested to the user or automatically included in campaigns.

User→Advocate Call to Action Outreach Personalization

Marketing and psychology research shows that people are more likely to respond to messages that appear personalized and reflect an understanding of the person, including their interests, beliefs, and motivations. Congressional affairs anecdotes strongly suggest that people who are motivated are much more likely to act and be successful in bringing about their desired outcome. In advocacy, as in marketing, increasing the number of advocacy request recipients opening the outreach (e.g. e-mail), and performing the requested action (e.g. clicking the e-mail link to a web form), is one measure of success, and increases the number of actions that ultimately are performed. Organizations will send different messages to the same audience over time, allowing for the identification of which advocacy requests elicited a response from specific recipients. Thus, it is possible to distinguish messages that did not generate interest overall (popularity) from messages that did not resonate with specific groups of recipients (polarity).

The advocacy system can be configured to collect historic data about advocates from multiple sources. The system may collect and store data over time through its normal operation. This historic data, or subsets thereof, may be used in the training set for training a model. The historic data can include, for example, any of the data referenced above with respect to feature vectors. Data may be collected and models retrained at various times, such as at periodic intervals (e.g. nightly), upon user request, or upon certain triggers such as completion of campaign.

Sources of advocate data can include, for example, previous advocacy campaigns, input by organization users, or advocates themselves (e.g. by responding to a survey). This collected data, coupled with the numerous and increasing data sources of demographic and other consumer information available for purchase or discovery, can be automatically combined and utilized to create personalized messages to advocates. Organization information may be obtained from external data sources (e.g. OpenSecrets, ZoomInfo, D&B, Political MoneyLine) and mapped to system user organizations via known name matching methods. Similarly, advocate, policymaker, and notable non-policymaker information may be obtained from external data sources (e.g. Whitepages, Spokeo, LinkedIn, Facebook, etc. to obtain job title, salary, gender, age, voting history, donation history, political identification, etc.).

Analytics on effectiveness, such as outcomes or results of advocacy campaigns, can be measured for different kinds of messaging and tested to increase rates of action over time by evaluating a metric of choice, such as, for example, increasing action rates or increasing donations over time, to align with an organization's key performance indicators. These analytics can inform which advocates to target, what to write in a user's call to action for their advocates, or the crafting of suggestions for best practices in achieving a specific outcome, such as an action, call, or donation. Suggestions for messages, such as where in the message to include links, how many links to include, the number of passive vs action sentences, and using previous calls to action messages can be evaluated for their effectiveness.

In one embodiment, the system performs a method that gives an organization user the ability to create a new campaign by filling in at least the title for a campaign and a template message that can be customized. The method can alternatively provide options for the user to select from a pre-existing list of campaigns already created, then select a set of advocates that will receive the message. Personal/demographic/previous usage/other information (merge fields, e.g. <name>, <amount donated>) about the advocates can be used to filter who gets the message and/or customize the content of the message. These merge fields can be used to insert custom information in a template and/or specify which kinds of information should be included in a message. Using machine learning models including correlations based on past results of prior messages, the system can optimize for a desired result metric.

The system can be configured to store advocate usage events and interaction as advocates interact with the system. The system can then utilize these previous usage events and interactions from previous campaigns, in addition to other personal information about advocates to build statistical/machine learning models. The system can use the models to determine the inclusion of which facets of personal information, organization information, policymaker, and/or policy document information correlate with increased likelihood of success in achieving desired result, such as in getting advocates to open an advocacy e-mail, or perform a desired action. More generally, the models can be configured to find statistically predictive factors of success, and those factors weighted high by the system as correlated with likelihood of an advocate performing action can be suggest to the user or inserted into the message. Such factors need not be limited to facets of personal information, but rather, can include any characteristics of a message transmitted to an advocate.

The models can be configured to operate on an individual advocate level, such as by creating a model for each advocate, or to operate on an aggregate level such as by creating a single model for groups of multiple advocates or all advocates (for an organization or even for the system as a whole across multiple client organizations of the system). The creation of messages can be based on either or both of individual and aggregate models.

A method for creating and sending advocacy campaign messages to advocates in accordance with certain embodiments will now be described with reference to the disclosed system.

The system can display to an organizational user a campaign creation interface that can include one or more areas or fields for receiving supplied text, along with an optional formatting or arrangement of the fields within a message. The fields can include, for example, a name for the campaign and a campaign message. The interface can also allow the user to specify one or more merge fields into which recipient-specific information or data can be populated by the system. The merge fields can include, for example, first name, last name, home address, city, state, title, company, business address. Additional merge fields can also be specified to receive additional facets of personal information to be determined by the system. The system can save the fields as part of a message template in a database.

The system can maintain or populate a database of target advocates or recipients. For each recipient, the database can store one or more facets of personal information about the recipient, such as biographical details, demographics and custom tags. The database can also store the recipient's previous usage of the system, such as content of messages previously sent to the recipient, stored along with recipient's response.

Using the information in the database, the system can calculate or determine one or more models that correlate inclusion or use of certain characteristics, such as certain facets of personal information about a recipient in a message, possibly in addition to other information, with the recipient's response to the message. The recipient's desired response can be that they perform a requested action as part of an advocacy campaign. Known machine learning modelling and/or statistical analysis techniques, such as those described above, can be applied to calculate or determine the models. The models can be configured to produce scorings, weightings, and/or likelihoods relating inclusion of individual facets or combinations of facets with certain outcomes of sending messages. The models can be configured based on predetermined optimization criteria to produce results. The optimization criteria can be specified to bias the models towards certain outcomes, such as a recipient sending a message to a policymaker.

The system can display to the organizational user a recipient selection interface. Through the recipient selection interface, the user can filter, group or select from among available target recipients to receive a message and the system will receive the user's selection. The interface can support filtering based on selection criteria that can include, for example, facets of personal information about the target recipients such as location, demographics, gender, income, ideology, past response rates, and donation amounts. The system can receive a selection by the sending user of a selected group of one or more advocate recipients of a message to be sent.

The system can apply the determined model(s) to the selected target recipients to obtain, for each of the selected recipients, a set of one or more message characteristics, such as specific facets of personal information, for inclusion in a message to the recipient. The model(s) can base its inputs on various data stored in the database for each recipient, such as the personal facets of information or more generally data in a personal profile for the recipient. The model(s) can also or alternatively base its inputs on information that is not specific to the recipient, such as, for example, a desired outcome or result of sending the message or such as the message template itself.

The model(s) can be applied to determine whether any available feature should be included or excluded from a message. For example, a message template can include tag for <job_title>. A user activity profile for a recipient can indicate a 10% response when <job_title> is included, 90% when not, so a message generator selects to remove the <job_title> tag and any containing phrase. Alternatively, if <job_title> is not included in original message template, but the recipient has 90% response with it, the generator can select to include and generate surrounding phrasing to include in message content. For generation of new text representing features that are not present in a message template, the generator can employ natural language templates corresponding to different kinds of features, e.g. "As a <job_title>, you know how hard it is", "Having donated <donation amount>. Alternatively, new text can be generated using a rule-based grammar, or new text can be generated using a pre-trained neural language model, such as GPT-3.

Using the message template, the system can generate natural language text content for a new message to the target recipient by merging the obtained set of one or more facets of personal information into the additional merge fields of the message template. The system can then send or cause the message to be sent to the target recipient, such as using the messaging engine to e-mail or text the message to the recipient, or to post the message for viewing by the user on a social media platform.

In certain embodiments, the generated natural language text content for a target recipient can be rendered in a user interface as a draft message for approval and sending by the organization user. In certain embodiments, a set of one or more message characteristics, such as facets of personal information selected by the model(s), are displayed as options to the organization user from which to select for inclusion in a message.

Advocate→Policymaker Action Personalization

Congressional affairs anecdotes strongly suggest that influxes of faxes, e-mails, or calls with generic, form messages are mostly ignored. Policymakers and their staff who usually receive the messages are much more likely to respond favorably to personal stories, anecdotes, and other unique attributes of their constituent communications. Crafting a message from scratch is a major obstacle, so to smooth the process of having advocates take action, organization users have previously created a prefilled message that they have carefully crafted for advocates to send directly to the policymaker. While this allows advocates to quickly submit a form message without the obstacle of spending time coming up with something to write, it creates many identical messages which are likely to be discounted or ignored.

Advocates have previously been provided with a form where they can select from a menu of one or more predetermined options, similar to selecting topics to follow when using a news service. Based upon the advocates' selections, fields in messages for the advocates to send to policymakers can be auto-populated. Such predetermined selectable options are limited, require manual effort from the system administration, and may not result in the desired outcomes, as they may not take into account that different policymakers may be receptive to different content in messages they receive.

In one aspect, the system can apply machine learning models to take into account facets of personal information about an advocate sending a message as well as a policymaker receiving the message when selecting content for inclusion in the message. For example, the system can collect or maintain information about a policymaker and information about an advocate (either directly entered by user, or ingested from third party provider, or other platforms, like from social media). Using this information, the system can automatically generate a personalized message containing content about the advocate (e.g. their demographics, previous work with an organization, or interest in other issues) and/or content about or relevant to the policymaker. Social science research and stakeholder management anecdotes demonstrate that connections between people are important to successful engagement. In addition to using information that can be collected and/or purchased about advocates and policymakers, social media (LinkedIn, Facebook, etc.), public donation (opensecrets, followthemoney, the Federal Election Commission, etc.) and the like can be used to find connection points between advocates and policymakers, which can be leveraged as additional personalization options.

In one embodiment, the system performs a method that selects message characteristics, such as certain facets of personal information, for inclusion in a draft message from an advocate to a policymaker. The draft message can be based on a message template that can be selected or created by an organization user or by an advocate. The system can maintain a personal profile including a set of personal profile characteristics for the advocate and the policymaker in a system database. The personal profile for an advocate can include, for example, personal information, demographic information, a location, a political affiliation, previous donations, and/or previous advocacy activity on a current or a related issue. The personal profile for a policymaker can include, for example, personal information, demographic information, a location, a political affiliation, and previous political activity on a current or a related issue.

Features of the advocate data record can be scored, such as by a machine learning model, based on fit to the current issue or fit to a target policymaker. Parts of a data record can be scored for fit/importance to determine what factors are important and to find connection points between the advocate and policymaker or issue. A subset of the advocate or policymaker facets, features and/or personal profile characteristics that score over some threshold deemed relevant, or up to some number of features, can be used to customize the content of the message from the advocate to the policymaker. The selected subset of features can be presented to the advocate as suggestions for inclusion in a message template or the selected subset can be automatically included in a substantially or fully completed draft message for review by the advocate. Optionally, the organization user can provide input to the system that adjusts the selected facets or features to optimize a metric, such as whether the policymaker acts in accordance with a recommendation included in the message.

The models can be configured to operate on an individual advocate and/or policymaker level, such as by creating a model for each advocate (with respect to multiple policymakers), for each policymaker (with respect to multiple advocates), and/or for each advocate-policymaker pair. The models can alternatively be configured to operate on an aggregate level such as by creating a single model for groups of multiple advocates and/or policymakers or all advocates and policymakers (for an organization or even for the system as a whole across multiple client organizations of the system). The creation of messages can be based on either or both of individual and aggregate models.

A method for creating and sending advocacy campaign messages from advocates to policymakers in accordance with certain embodiments will now be described with reference to the disclosed system.

The system can display to an organizational user a campaign creation interface that can include one or more areas or fields for receiving supplied text, along with an optional formatting or arrangement of the fields within a message. The fields can include, for example, a name for the campaign and a campaign message for the target policymaker. The interface can also allow the user to specify one or more merge fields into which sender and/or recipient-specific information or data can be populated by the system. The merge fields can include, for example, first name, last name, home address, city, state, title, company, business address. Additional merge fields can also be specified to receive additional facets of personal information of the sender or the recipient to be determined by the system. The system can save the fields as part of a message template in a database.

The system can maintain or populate a database of advocate message senders. For each sender, the database can store one or more facets of personal information about the sender, such as biographical details, demographics and custom tags. The database can also store the sender's previous usage of the system, such as content of messages previously sent by the sender, along with outcomes of policymakers decisions after having received a message from the sender.

The system can also maintain or populate a database of policymaker recipients. For each policymaker recipient, the database can store one or more facets of personal information about the recipient, such as biographical details, demographics, custom tags, policy proposals and votes. The database can also aggregate (e.g. using publicly available sources) and store the policymaker's decisions after having received prior messages from the system and/or sending advocate.

The system can optionally display to an advocate sender, such as through the campaign website, a policymaker selection interface through which the advocate can filter or group a list of policymakers to target based on a selection criteria. The filtering can be performed based on facets of personal information about the policymakers and/or advocate sender. For example, the system can provide a filter that scores different policymakers based on filter criteria set by an advocate sender, such as geographic/jurisdictional proximity between the sender and policymaker. The system can then receive a selection by the advocate sender of a selected group of one or more policymaker recipients of a message to be sent.

Using the information in the databases, the system can calculate or determine one or more models that correlate inclusion of message characteristics such as facets of personal information about a sender, a recipient or both in a message, possibly in addition to other information, with outcomes of policymakers decisions after having received a message from the sender. Known machine learning modelling and/or statistical analysis techniques can be applied to calculate or determine the models. The models can be configured to produce scorings, weightings, and/or likelihoods relating inclusion of individual facets or combinations of facets with certain outcomes of sending messages. The models can be configured based on predetermined optimization criteria to produce results. The optimization criteria can be specified to bias the models towards certain outcomes, such as a policymaker taking action consistent with the message sent.

The system can apply the determined model(s) to the advocate sender and one or more of the selected target policymaker recipients to obtain, for each of the selected recipients, a set of one or more facets of personal information for inclusion in a message to the recipient. The model(s) can base its inputs on various data stored in the database for each sender and/or recipient, such as personal profile characteristics and/or the personal facets of information of the senders and recipients. The model(s) can also or alternatively base its inputs on information that is not specific to the sender or recipient, such as a desired outcome or result of sending the message to the policymaker or such as the message template itself.

Using the message template, the system can generate natural language text content for a new message to the target recipient by merging the obtained set of one or more facets of personal information into the additional merge fields of the message template. The system can then send or cause the message to be sent to the target recipient, such as using the messaging engine to e-mail or text the message to the recipient, or to post the message for viewing by the user on a social media platform.

Use of Computational Models to Optimize Outcomes

FIGS. 6A-B illustrate methods in accordance with various embodiments for using computational models to optimize outcomes of sending messages in support of an advocacy campaign. The methods described below can be performed by a computer system having at least one processor and a memory. A non-transitory computer readable medium can have instructions stored thereon, wherein the instructions are executed by the least one processor and cause the at least one processor to perform the methods.

The messages can each be sent by or on behalf of a respective sender to a respective recipient. The sender can be, for example, a user of the computer system acting on behalf of the advocacy campaign, or an advocate being asked to act on behalf of the campaign. The recipient of the message can be, for example, an advocate being requested to support or advocate on behalf of the advocacy campaign. The recipient might alternatively be an elected representative being asked to act or vote in support of the campaign.

The messages may be sent by the computer system or merely created by the computer system for separate transmission. Each message can transmitted, for example, by one or more of: e-mail; text message; phone call; social media posting; electronic messaging through a messaging platform; and postal mail.

Referring to FIG. 6A, at a step 602 the system can be configured to maintain and operate a first computational model configured to output a score indicative of a requested action being performed by a recipient of a message. The first computational model can be, for example, one of: a machine learning model; a neural network; and a statistical model.

The score output by the first computational model can be, for example, one of: a statistical indication; a probability; a likelihood; a certainty; a value; and an amount.

The requested action can be, for example, any one of: acting in support of the respective advocacy campaign; sending a further message in support of the respective advocacy campaign; providing financial support to the respective advocacy campaign; contributing time or volunteering in support of the respective advocacy campaign; creating, proposing, or drafting legislation in support of the advocacy campaign; and voting on legislation in accordance with the advocacy campaign.

At a step 604, the system builds a data set based upon which to train the first computational model. To do this, in one embodiment, the system transmits a plurality of messages to a plurality of message recipients, wherein each of the plurality of messages includes a request for a respective recipient to perform an action. The messages can be transmitted over the course of time as the system is used in the normal course of its operations, and each message can be transmitted by or on behalf of a respective sender.

At a step 606, for each transmitted message in the data set, the system can determine an outcome of the request after transmission of the message. By way of example, if the requested action is a request to donate in support of the campaign, the system can determine whether a donation was made and/or the amount. If the requested action is a request for the recipient to use the system's messaging functionality to send a message to a policymaker, the system can determine whether the message was sent. If the request was for the recipient to vote a certain way on a certain item of legislation, the system can be configured to access third party data sources to determine the recipient's vote.

At a step 608, for each transmitted message in the data set, the system can encode multiple message characteristics of the message into a message feature vector. The multiple message characteristics can represent or include various aspects and properties of the message. These characteristics can include, for example: the message topic (e.g. a description, category, tag or name of the topic of the message, possibly selected from an ontology of possibilities); the requested action (e.g. a description, category, tag or name of the action being requested of the recipient, possibly selected from an ontology of possibilities); the complete content of a message (e.g. the text of the message); components of the message content (e.g. whether each of various words and/or phrases are present in the message); message formatting (e.g. text/background color, font, spacing, use of images); arrangement of message content within a message (e.g. whether the request for action is at the top or the bottom, or both); and message metadata (e.g. the name/identity of the sender and/or recipient, stylesheet used, date/time sent, time since most recent prior message was sent).

The encoding of the characteristics can be done using known techniques for encoding data for processing by computational models, such as binary, numeric and/or categorical representations. Each characteristic can be encoded as a feature, which can be associated with a named property or characteristic, along with a value for the feature. The encoding of the multiple features, in turn, can be assembled into a feature vector. Message features can include, for example, any machine representation of text (e.g. words, embeddings), syntactic analysis (e.g. number of pronouns, number of exclamation marks, location of emojis), or semantic analysis of text (e.g. entities, topics, keywords, count of emotional appeal arguments, rational appeal arguments, count of ask for donation, location of emotional appeal argument, location of ask for donation). For example, location of a "donate now" request can be encoded as sentence number within message, quantile of message, or top/bottom. A message topic can be encoded as binary presence or as score associated with a named topic. Sentiment or polarity can be encoded at the word/sentence/message level, as a pos/neg/neutral label, or score associated with label.

At a step 610, for each transmitted message in the data set, the system can encode multiple personal profile characteristics specific to the respective recipient into a personal profile feature vector for the respective recipient. The personal profile characteristics can include, for example, facets of personal information, such as biographical details, demographics, custom tags, policy proposals, and votes. The personal profile characteristics can also or alternatively include, for example, one or more message characteristics or a set of message characteristics associated with a requested action being performed by a recipient of a message. By way of example, a personal profile characteristic can indicate that a certain color background in a message to a particular recipient is associated with the recipient being more likely to perform a requested action.

At a step 612, for each transmitted message in the data set, the system can encode multiple personal profile characteristics specific to the respective sender into a personal profile feature vector for the respective sender. The personal profile characteristics can include, for example, facets of personal information, such as biographical details, demographics, and custom tags. The personal profile characteristics can also or alternatively include, for example, one or more message characteristics or a set of message characteristics associated with a requested action being performed by a recipient of a message sent by the respective sender. By way of example, a personal profile characteristic can indicate that a certain color background in a message by the respective sender is associated with recipients being more likely to perform a requested action.

At a step 614, for each transmitted message in the data set, the system can provide the outcome of the request, the message feature vector, the personal profile feature vector for the respective recipient, and the personal profile feature vector for the respective sender as a training input to the first computational model. The model is, accordingly, trained on these inputs for the transmitted messages in the data set in order to output a score indicative of a requested action being performed by a recipient of a message based on new inputs.

It will be noted that in various embodiments, either step 610 or 612 can be omitted and the corresponding personal profile feature vector also omitted from the inputs to the first computational model. In the case that step 610 is omitted, the first computational model can operate on inputs including personal profile feature vectors for senders while omitting personal profile feature vectors for recipients. In the case that step 612 is omitted, the first computational model can operate on inputs including personal profile feature vectors for recipients while omitting personal profile feature vectors for senders.

At a step 616, the system receives an instruction to send a new message to a target recipient. As with the prior messages in the training data set, the new message includes a request for the target recipient to perform a new action in support of an advocacy campaign. The instruction can be to send the new message by or on behalf of a respective sender of the new message. The instruction can be provided, for example, through a computer user interface such as a web page or a mobile phone app. The instruction can be received, for example, from a system user seeking to directly send messages to multiple advocates in order to request those advocates take action on behalf of the campaign. The instruction can alternatively be received from an advocate user seeking to send a message or have a message sent by the system to a legislative representative or other party whom the campaign is seeking to influence. The instruction from the advocate user can, for example, be in response to a prior message sent by the system requesting the advocate user take action to send a message to the legislative representative.

At a step 618, the system creates multiple different sets of message characteristics where each set of the multiple different sets represents a combination of multiple possible message characteristics for the new message. The various sets of message characteristics can be created, for example, by randomly selecting values for different characteristics to create various combinations. Instead of creating all possible sets of combinations, individual characteristics that have demonstrated past success can be included in the combinations while characteristics that have not been previously successful can be omitted from the combinations.

Referring to FIG. 6B, at a step 620, the system encodes a plurality of personal profile characteristics specific to the target recipient into a personal profile feature vector for the target recipient. This step is similar to step 612, above, but for the target recipient.

At a step 622, the system encodes a plurality of personal profile characteristics specific to the respective sender of the new message into a personal profile feature vector for sender. This step is similar to step 614, above, but for the sender of the new message.

At a step 624, for each set of message characteristics of the multiple different sets of message characteristics, the system encodes the set of message characteristics into a message feature vector. This step is similar to step 608, above, but for one set of message characteristics being considered (of the multiple different sets).

At a step 626, for each set of message characteristics of the multiple different sets of message characteristics, the system provides the personal profile feature vector for the respective sender of the new message, the message feature vector, and the personal profile feature vector for the target recipient as an input to the first computational model. The model then outputs a score indicative of the new action being performed by the target recipient in response to receiving a message having the set of message characteristics being considered (of the multiple different sets).

At a step 628, the system selects a set of message characteristics from the plurality of different sets based on the score output by the first computational model for each set. The system can select the set of message characteristics having, for example, a maximum score or a score most highly correlative with the new action being performed by the target recipient. At a step 630, the system creates the new message based on the selected set of message characteristics, and at a step 632, the system sends the new message to the target recipient.

Of the scores output by the model for the various different sets, the system can be configured to compare a maximum score most highly correlative with the new action being performed by the target recipient to a predetermined minimum threshold. It may be the case that for a particular target recipient, the maximum score may be below a certain minimum threshold, which would indicate that the selected best set of message characteristics would still be unlikely to result in a new action being performed by the target recipient. In such a case, the system would first determine that the maximum score meets (e.g. is greater than, or greater than or equal to) a predetermined threshold before sending the new message to the target recipient. In the cast the maximum score does not meet the threshold, the system can opt to not send the message. In addition or alternatively, the first computational model can be configured to further output a confidence value in association with the score indicative of the new action being performed by the target recipient in response to receiving a message having the each set of message characteristics. The confidence value can alternatively be used to determine whether to send a message.

The system can be configured to receive from an authoring user (e.g. any system user or sender) a specification of a message template for the new message. The message template can include an arrangement of: static text common to all messages based on the message template; and variable fields into which different data can be populated for different messages based on the template. The variable fields can be populated based on the selected set of message characteristics to create the new message.

The system can be configured to create the new message based on the selected set of message characteristics by first presenting to a respective sender of the new message, in a computer user interface, a multiple options for creating the new message. The multiple options can be based on the selected set of message characteristics. The sender can then select one or more of the plurality of options through the user interface and the system can create the message in accordance with the sender's selections.

The set of message characteristics selected by the system can indicate inclusion of certain text within a message. The certain text can be, for example, a facet of personal information. The facet of personal information can be for example one of: a biographical detail, demographic information, a custom tag, a policy proposal, and a vote. The set of message characteristics selected by the system can indicate exclusion of certain text within a message. The selected set of message characteristics can indicate an absolute or relative duration of time since a most recent prior message was sent to the target recipient. The selected set of message characteristics can indicate one or more of a time of day and a day of week when the new message is transmitted.

Figure 7A:
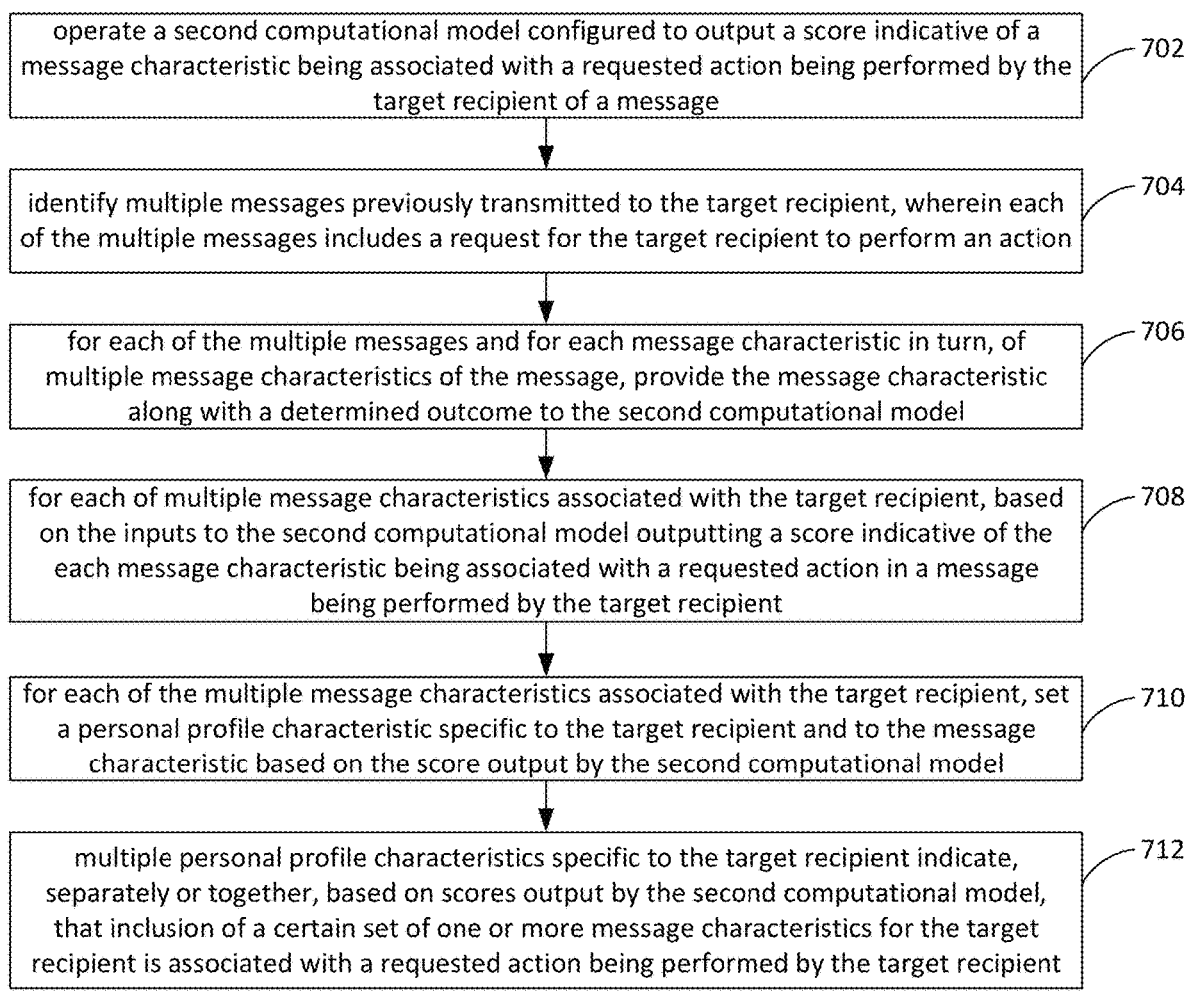
FIG. 7A illustrates a method that can be performed in conjunction with the methods of FIGS. 7A-B to set personal profile characteristics for a recipient.
Figure 7B:
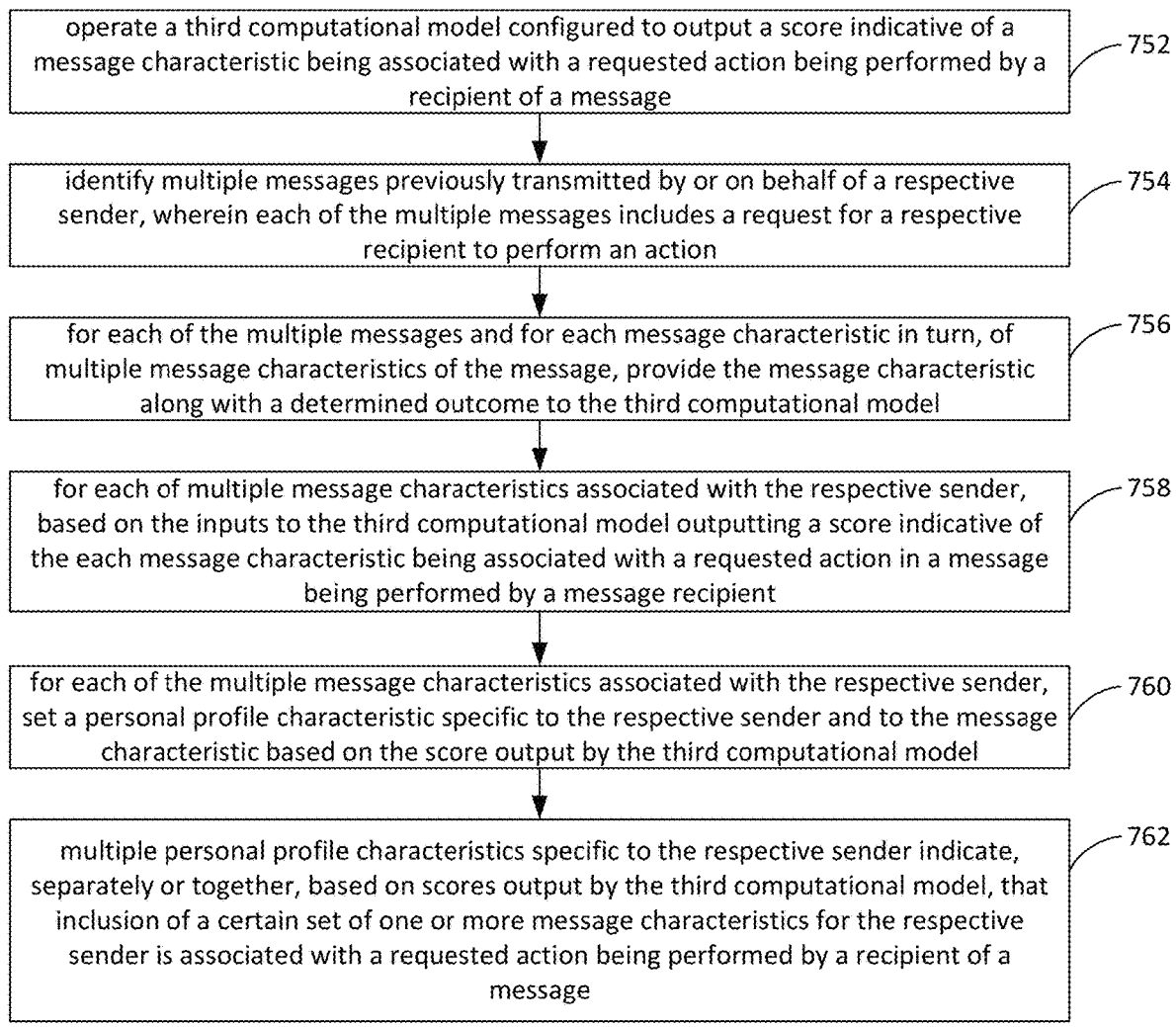
FIG. 7B illustrates a method that can be performed in conjunction with the methods of FIGS. 7A-B to set personal profile characteristics for a sender.

FIG. 7A illustrates a method that can be performed in conjunction with the methods of FIGS. 6A-B to set personal profile characteristics for a recipient indicative of a requested action being performed by the target recipient of a message. FIG. 7B illustrates a method that can be performed in conjunction with the methods of FIGS. 6A-B to set personal profile characteristics for a sender indicative of a requested action being performed by the target recipient of a message. Each of the methods illustrated in FIG. 7A-B can initially be performed prior to the step 616 of FIG. 6A, in which the system receives an instruction to send a new message to a target recipient, but these methods can also be performed iteratively on an ongoing basis as the system sends messages over time in the course of normal operation.

Referring to FIG. 7A, at a step 702, the system can be configured to maintain and operate a second computational model configured to output a score indicative of a message characteristic being associated with a requested action being performed by the target recipient of a message. The second computational model can be, for example, one of: a machine learning model; a neural network; and a statistical model. The score output by the second computational model can be, for example, one of: a statistical indication; a probability; a likelihood; a certainty; a value; and an amount.

At a step 704, the system identifies multiple messages previously transmitted to the target recipient, wherein each of the multiple messages includes a request for the target recipient to perform an action. Some or all of the messages can be selected from the messages referenced above in step 604 of FIG. 6A, and/or additional messages sent to the target recipient can be used.

At a step 706, for each of the multiple messages previously transmitted to the target recipient, the system, for each message characteristic in turn, of multiple message characteristics of the each message, provides the message characteristic along with a determined outcome of the request as an input to the second computational model. The multiple message characteristics can be provided to the model in the form of a message feature vector along with the determined outcome of the request.

At a step 708, for each of multiple message characteristics associated with the target recipient, based on the inputs to the second computational model, the second computational model outputs a score indicative of the each message characteristic being associated with a requested action in a message being performed by the target recipient. At a step 710, for each of the multiple message characteristics associated with the target recipient, the system sets a personal profile characteristic specific to the target recipient and to the message characteristic based on the score output by the second computational model.

At a step 712, upon completion of step 710, the system will have set multiple personal profile characteristics specific to the target recipient that indicate, separately or together, based on scores output by the second computational model, that inclusion of a certain set of one or more message characteristics for the target recipient is associated with a requested action being performed by the target recipient of a message.

Referring to FIG. 7B, at a step 752, the system can be configured to maintain and operate a third computational model configured to output a score indicative of a message characteristic being associated with a requested action being performed by a recipient of a message. The third computational model can be, for example, one of: a machine learning model; a neural network; and a statistical model. The score output by the third computational model can be, for example, one of: a statistical indication; a probability; a likelihood; a certainty; a value; and an amount. In certain embodiment, the third computational model can be the same computational model as the second computational model.

At a step 754, the system identifies multiple messages previously transmitted by or on behalf of a respective sender, wherein each of the multiple messages includes a request for a respective recipient to perform an action. Some or all of the messages can be selected from the messages referenced above in step 604 of FIG. 6A, and/or additional messages sent by or on behalf of the respective sender can be used.

At a step 756, for each of the multiple messages previously transmitted by or on behalf of the respective sender, the system, for each message characteristic in turn, of multiple message characteristics of the each message, provides the message characteristic along with a determined outcome of the request as an input to the third computational model. The multiple message characteristics can be provided to the model in the form of a message feature vector along with the determined outcome of the request.

At a step 758, for each of multiple message characteristics associated with the respective sender, based on the inputs to the third computational model, the third computational model outputs a score indicative of the each message characteristic being associated with a requested action in a message being performed by a message recipient. At a step 760, for each of the multiple message characteristics associated with the respective sender, the system sets a personal profile characteristic specific to the respective sender and to the message characteristic based on the score output by the third computational model.

At a step 762, upon completion of step 760, the system will have set multiple personal profile characteristics specific to the respective sender that indicate, separately or together, based on scores output by the third computational model, that inclusion of a certain set of one or more message characteristics for the respective sender is associated with a requested action being performed by a recipient of a message.

Identification of Issues Meriting the Launching of an Advocacy Campaign

Discovery of policy documents, such as relevant news, policy introductions, press statements, legislation, regulation, or lobbying disclosures, for an organization can be automated through services like Google Alerts and FiscalNote Discovery Alerts. With thousands of bills and regulations announced a day during the busy period of legislative sessions, however, it can be difficult to identify and keep up with what policies or policymaker decisions may be important to and worth pursuing by an organization and/or its advocates. On one hand, an organization user does not want to miss the opportunity to run a campaign on something that is important to the organization or its advocates. On the other hand, the organization user does not want to run too many unsuccessful campaigns that might burden or bore its advocates, risking their unsubscribing or ceasing their membership, especially on issues that are unlikely to be swayed.

In one embodiment, the system performs a method that identifies issues of importance to an organization and that would be likely to result in an effective advocacy campaign. The system can present an issue definition interface to an organization user. The issue definition interface can be presented in a computer user interface, such as a web page. Through the issue definition interface, the organization user can define criteria for an issue area relevant to the organization. The system can store the criteria and use the criteria to retrieve candidate issue information for consideration. The candidate issue information, such as a news article, a policy proposal, or a social media post, can be obtained by ingesting information. For example, information can be received by setting up third party alert services to generate news feeds or recommendation engines based on the user-supplied criteria. The candidate issue information can also or alternatively be received directly by crawling and/or scraping Internet-accessible sources of information, and processing or filtering the information for relevance based on the supplied criteria.

The system can create a mathematical model, a machine-learning model or generate statistics based upon the outcomes of past campaigns, where the model(s) or statistics can be used to determine the likelihood that a new campaign relating to the candidate issue information would be likely to generate a worthwhile response.

For any item of received candidate issue information, the system can apply the model or statistics to the candidate issue in order to determine a likelihood or score that the candidate issue would be relevant to the organization user and/or the organization's advocates. For a candidate issue determined to exceed a predefined threshold or score, the system can create an alert bringing the candidate issue information to the attention of the organization user. The alert can be conveyed, for example, by way of a message (e.g. e-mail or text) or by displaying the alert on the organization account website or using any other alerting mechanism.

The disclosed system can be configured to combine the relevancy of something matching a news alert search term (many alerts can be set up) or surfaced through a recommendation model (many news feeds can be set up), with information about an organization's policy agenda, previous activity (relations of content that are similar, targeting similar issues), and the interest base of its advocates. The combination can be used to alert an organization user that they may want to consider running a campaign that is on an issue that is both relevant to them or to their advocates and has a likelihood of being successful in achieving the organization's goal.

In one embodiment, the disclosed system can determine the relevancy of an issue to an organization for creating an advocacy campaign. For example, the system may determine a potential issue, e.g. news story, policy, and score it with respect to information about an organization's policy agenda, including previous activity (e.g. relations of content that are similar, targeting similar issues, or targeting similar industry) and the interest base of its advocates. The interest base of the advocates can be sourced through their previous activity and/or through policymakers who have been contacted along with their previous activity/responses to advocacy. The combination can be used to alert an organization user that they may want to consider running a campaign that is on an issue that is both relevant to them or to their advocates and has a likelihood of being successful in achieving the organization's desired outcome.

Figure 8:
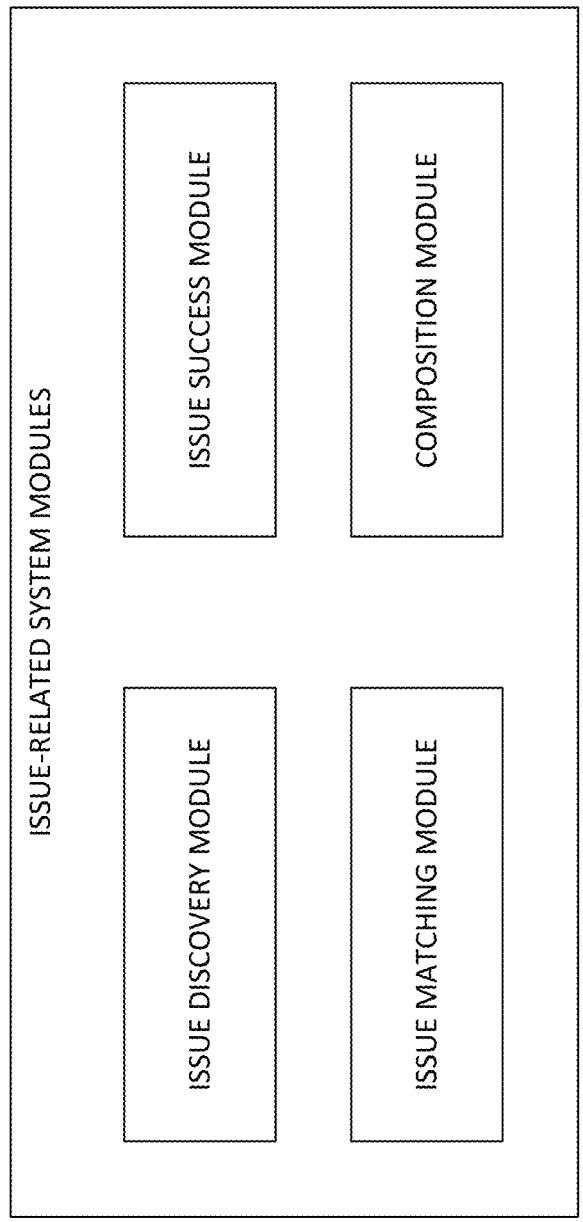
FIG. 8 illustrates a collection of modules any one or more of which can be included in the system for use in identifying and/or selecting issues meriting the launching of an advocacy campaign.

FIG. 8 illustrates a collection of modules any one or more of which can be included in the system for use in identifying and/or selecting issues meriting the launching of an advocacy campaign. The modules can include, for example: an issue discovery module, an issue matching module, an issue success module, and a composition module.

An issue discovery module can be used to determine or identify a candidate issue for potential consideration for use in or for a campaign. The issue discovery module can be configured to receive a plurality of policy documents, and compute a plurality of relevance scores. A relevance score may be computed by matching a query search term(s) over the policy documents (e.g. news, social media, policy, etc.). For instance, the system can be configured to receive from a user a specification of a plurality of query search terms through a user interface, the query search terms can be saved to a database or search engine, such as Elasticsearch, and a percolator can be used to match the plurality of query search terms against a plurality of new or changed policy documents. When any new or changed documents match, the system can generate a relevance score for the match. The system can be configured to generate an alert to the user upon a query to document match. The relevance score of the match can also or alternatively be compared against a threshold relevance score, and only scores above a specified threshold may generate an alert. The system can be configured to generate an alert in the user interface, or to push an alert to a user, for example, in an e-mail, using an API, or through text message. The system can also be configured to receive from a user through a user interface a weight to be assigned to a query term.

The system can be configured to use a historical set of data indicating a user's interest base, including campaign messages and policy documents indicated by the user through interaction with the system, to seed the query search terms. The system may use one or more known natural language processing methods for keyword extraction (e.g. Graph-based methods such as TextRank, frequency-based methods, TFIDF, RAKE, or ML-based methods using CRFs or a sequence-to-sequence neural network model) to automatically generate a plurality of phrases for the query search terms. The historical set of data can include advocate messages. The keyword extraction method can be configured to generate a confidence score for the relevance of the extracted keyword. The system can use the confidence score of the extracted keyword to weigh the resulting relevance match score. For example, an organization may be interested in an issue around obligations for animals struck on the road. A keyword extraction model can be configured to automatically identify keyphrases "accidental taking", "dead wildlife", "wildlife salvage permit", and "wildlife-vehicle collision" from historical data, with associated scores of 1, 3, 5, 5, indicating a higher degree of confidence in the relevance of the latter two extractions. The system can use this weight to compute a weighted relevance score in the query matching algorithm, and weigh matches of "wildlife salvage permit", and "wildlife-vehicle collision" 5 times greater than "accidental taking".

The issue discovery module can be configured to construct/utilize a content-based, item-based, or hybrid recommendation model to produce a plurality of relevance scores. The recommendation model can be based on computing one or more similarity measures using a historical set of data indicating an organization's interest base and the plurality of new or changed policy documents and associated metadata. The similarity measure can be based on document feature vector similarity using any known similarity metric (e.g. cosine, Euclidean, Jaccard). The similarity measure can produce a score indicating the degree of similarity between documents represented in historic data and the plurality of new or changed policy documents. The relevance score can be based on the similarity score produced by one or more similarity measures. The recommendation model can alternatively or additionally be implemented using available recommendation services supplied by a third party such as Google or Amazon. The recommendation model can be configured to utilize metadata with/in place of the policy document content. The metadata can include, for example, the identification of policymakers or locations impacted by policy document. For example, an organization may be interested in a policy document that contains an issue that has not been previously messaged on by the organization, but it pertains to a policymaker to whom the organization often requests messages be sent.

An issue matching module can be used to select historical data relevant to a particular issue. The issue matching module may utilize the metadata associated with the issue representation to match the plurality of policy documents to select relevant historical data. For example, given policy documents with the locality of France, the issue matching module may select all previous campaigns associated with the locality of France. As another example, given policy documents authored by Senator Smith and Representative Jones, the issue matching module may select all previous campaigns associated with either Senator Smith or Representative Jones.

The issue matching module may use the text content of policy documents of a candidate issue to match the text content of policy documents associated with previous campaigns, campaign messages, or advocate messages. One or more vector similarity measures, as described above, can be used to select a plurality of previous policy documents, campaign messages, or advocate messages that have a similarity above a certain threshold, and the campaigns associated with those are selected as relevant historic data. The derived analysis (e.g. topics, impact size, industry impacted) may be used by the issue matching module. For example, if a new policy document selected by the discovery module is labeled with the "Retail Operations" and "Industrial Waste" topics, the issue matching module may select previous campaigns associated with one or more of those topics. The topics can be represented with relations to one another (e.g. hierarchical), and related topics may be used to select relevant historic data. For example, "Industrial Waste" may be related to the "Environmental Protection" topic, and previous campaigns related to the latter may be selected as relevant. As another example, if an entity extraction analysis of a new policy document extracts the entity "XL Pipeline", the issue matching module may select previous campaigns that were associated with that entity. The matching module may use the issue discovery module described above to select relevant historic data.

An issue success module can be used to determine or predict the likely success of an issue to be used in or for a campaign. The issue success module can be configured to receive an issue representation, and generate one or more predicted outcome probabilities. The issue representation may include the policy documents. The issue success module may compute, create or train an issue success model to predict one or more success metrics based on the issue representation and historical data. Historical data may include, for example, previous campaigns, previous campaign messages, advocates (e.g. number, locality, demographics, messages, etc.), and prior outcomes.

The issue success module can be configured to receive, such as from a user through a user interface, the type of success metric the organization is interested in (e.g. open rate, action rate, passage of policy). For example, the issue success module can be configured to predict a probability of passage for a policy document.

The issue success module can be configured to create a statistical model using the relevant historic data. The statistical model, in turn, may compute a probability of a desired outcome by calculating the ratio of campaigns achieving the desired outcome to campaigns not achieving the desired outcome. The statistical model may, for example, compute a distribution, an average, a range, a minimum, or a maximum. For example, if the desired outcome is achieving a certain action rate, the average action rate of campaigns in relevant historic data may be computed. As another example, if the desired outcome is raising a certain amount of money, then the maximum amount of money raised in relevant campaigns may be computed.

A threshold for a desired outcome may be set, for example, by a user through a user interface. For example, if the average money raised computed by the statistical model based on the relevant historic data is above a certain threshold, the issue success module may set the probability to 1. Similarly, if the minimum action rate computed by the statistical model based on the relevant historic data is above a certain threshold, the issue success module may set the probability to 1. If the maximum action rate computed by the statistical model based on the relevant historic data is below a certain threshold, the issue success module may set the probability to 0.

The issue success module can be configured to construct a model using user created rules. For example, the user may specify a rule that a bill reintroduced by the same sponsor who was successfully lobbied last year by the organization should be assigned a probability of 1. Then when a new bill is alerted on by the issue discovery module, and a historical campaign is selected as relevant because it is associated with the sponsor and a bill with similar content, the new bill can be assigned a probability of 1. As another example, the user may specify that if the average desired outcome computed by the statistical model was achieved in 50% or more of the relevant historical campaigns identified by the issue matching module, then the issue success module can assign a probability of success of 1 to the new policy document.

The issue success module can be configured to construct a model using machine learning to generate the outcome probabilities. The model may be trained with known machine learning algorithms referenced above using training data including relevant historic data identified by the issue matching module. The input training data may include, for example, policy documents, campaign messages, advocate messages, associated metadata. The output can be one or more desired outcomes associated with the historic data. A plurality of machine learning models may be trained, where the input data are previous policy documents associated with a campaign, represented as document feature vectors, paired with multiple outcomes. The plurality of models can determine, for example: the open rate of campaign messages, the action rate of messages, and the ultimate success of the campaign. One or more models may be trained on each outcome. For example, open rate model may be trained using the open rate outcome, action rate model may be trained using the action rate as the outcome. For another example, a machine learning model may be trained to predict money raised, where the input data are previous documents associated with a campaign paired with outcome of how much money was donated. These models may be applied to new policy documents to generate a predicted action rate, open rate, or money raised. If any model produces a prediction above a threshold, the new policy document can be assigned a probability of 1.

Predictions from one or more models may be combined. For example, a rule may require that all models must predict over a threshold in order to produce a probability of 1. The threshold can be specified, for example, by user input or computed automatically relative to peer group (peer group may be system user organizations previous set of campaigns, system user organizations campaigns in this issue area, aggregate of organizations in this industry, aggregate from all organizations, etc.). The probability generated by the issue success module may be the one or aggregated plurality of predictions generated by the one or more models. A weighted combination of model predictions can be used. The weighting can be specified, for example, by user input or the system may compute a weighting using machine learning. One or more of a rule, statistical, and machine learning based models may be utilized by the issue success module.

The issue discovery module and success module may operate independently. For example, a user may receive a set of policy documents from the discovery module and then send the policy documents to the issue success module. Alternatively, the user may send documents to the issue success module without previously receiving them from the discovery module. For example, the user may want to create a campaign on a completely new issue. The discovery module and success module may operate sequentially automatically, with the former automatically sending matches to the latter.

A composition module can be configured to take input from the issue discovery module and/or issue success module to generate a score/likelihood of whether the issue should be displayed to the user for a campaign. If the score is above a specified threshold (e.g. user specified or system specified), the user can be alerted to the new policy documents. The threshold for alerting based on the score of the composition module may be specified by the user or computed. A machine learning model may be trained using the previously generated composition model scores as input, paired with an outcome of whether the user ran a campaign, and/or the plurality of outcomes of the campaign.

The composition module may compute a score indicating a plurality of likelihoods of outcomes based on a combination of a plurality of relevance scores produced by the issue discovery module and plurality of probabilities predicted by the issue success module. The combination may be weighted, and the user may specify a weighting or the system may compute a weighing using machine learning. For example, the system may train a model using machine learning to learn the weights of each component score/probability generated by the discovery module and issue success module. The training data used to train the model may be previously generated scores/probabilities from the discovery module and issue success module, and paired with an outcome of whether the user ran a campaign, and/or the plurality of outcomes of the campaign.

The system can receive from an organization user (through a user interface) identified issues they care about, and the system can collect external policy, news, statements, and/or issue related data from the Internet. The system can either access or be provided (through a user interface) user/organization information indicating issue areas of importance to the organization and its advocates/members, as well as previous advocacy campaign activity associated with those issues. The previous campaign activity can include metrics, such as action rates, and different measures of success types (fund raising, influence policy). By way of example, a user may have run a previous campaign on a Florida and California bill on deforestation where the Florida campaign had very low action and unsuccessful conclusion, while the California one had high action and a successful outcome. Based on a computed score for how likely a newly identified issue is to be worthy of running a campaign again, the system can display in a user interface or otherwise alert a user that it may be worth initiating an advocacy campaign.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 9:
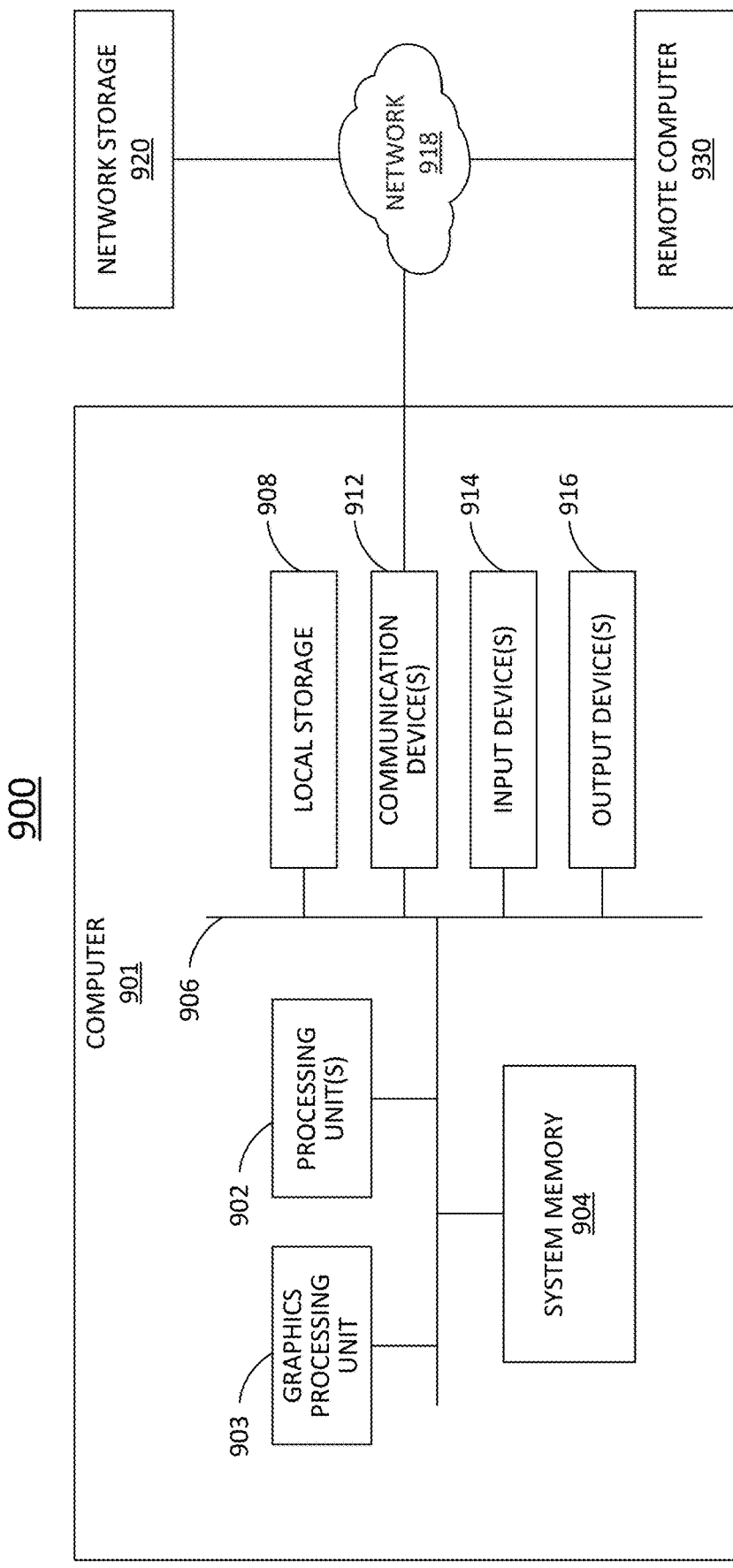
FIG. 9 illustrates a general computer architecture that can be appropriately configured to implement components disclosed in accordance with various embodiments

FIG. 9 illustrates a general computer architecture 900 that can be appropriately configured to implement components disclosed in accordance with various embodiments. The computing architecture 900 can include various common computing elements, such as a computer 901, a network 918, and one or more remote computers 930. The embodiments disclosed herein, however, are not limited to implementation by the general computing architecture 900.

Referring to FIG. 9, the computer 901 can be any of a variety of general purpose computers such as, for example, a server, a desktop computer, a laptop computer, a tablet computer or a mobile computing device. The computer 901 can include a processing unit 902, a system memory 904 and a system bus 906.

The processing unit 902 can be or include one or more of any of various commercially available computer processors, which can each include one or more processing cores that can operate independently of each other. Additional co-processing units, such as a graphics processing unit 903, also can be present in the computer.

The system memory 904 can include volatile devices, such as dynamic random access memory (DRAM) or other random access memory devices. The system memory 904 can also or alternatively include non-volatile devices, such as a read-only memory or flash memory.

The computer 901 can include local non-volatile secondary storage 908 such as a disk drive, solid state disk, or removable memory card. The local storage 908 can include one or more removable and/or non-removable storage units. The local storage 908 can be used to store an operating system that initiates and manages various applications that execute on the computer. The local storage 908 can also be used to store special purpose software configured to implement the components of the embodiments disclosed herein and that can be executed as one or more applications under the operating system.

The computer 901 can also include communication device(s) 912 through which the computer communicates with other devices, such as one or more remote computers 930, over wired and/or wireless computer networks 918. Communications device(s) 912 can include, for example, a network interface for communicating data over a wired computer network. The communication device(s) 912 can include, for example, one or more radio transmitters for communications over Wi-Fi, Bluetooth, and/or mobile telephone networks.

The computer 901 can also access network storage 920 through the computer network 918. The network storage can include, for example, a network attached storage device located on a local network, or cloud-based storage hosted at one or more remote data centers. The operating system and/or special purpose software can alternatively be stored in the network storage 920.

The computer 901 can have various input device(s) 914 such as a keyboard, mouse, touchscreen, camera, microphone, accelerometer, thermometer, magnetometer, or any other sensor. Output device(s) 916 such as a display, speakers, printer, or eccentric rotating mass vibration motor can also be included.

The various storage 908, communication device(s) 912, output devices 916 and input devices 914 can be integrated within a housing of the computer, or can be connected through various input/output interface devices on the computer, in which case the reference numbers 908, 912, 914 and 916 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Alternative and Additional Embodiments

A method can be performed by a computer system having at least one processor and a memory. The method can include: operating a first computational model configured to output a score indicative of a requested action being performed by a recipient of a message; transmitting a plurality of messages to a plurality of message recipients, wherein each of the plurality of messages includes a request for a respective recipient to perform an action; for each message of the plurality of transmitted messages: determining an outcome of the request after transmission of the message;

encoding a plurality of message characteristics of the message into a message feature vector; encoding a plurality of personal profile characteristics specific to the respective recipient into a personal profile feature vector for the respective recipient; and providing the outcome of the request, the message feature vector and the personal profile feature vector for the respective recipient as a training input to the first computational model; receiving an instruction to send a new message to a target recipient, wherein the new message includes a request for the target recipient to perform a new action; creating a plurality of different sets of message characteristics, wherein each set of the plurality of different sets represents a combination of a plurality of possible message characteristics for the new message; encoding a plurality of personal profile characteristics specific to the target recipient into a personal profile feature vector for the target recipient; for each set of message characteristics of the plurality of different sets: encoding the set of message characteristics into a message feature vector; and in response to providing the message feature vector and the personal profile feature vector for the target recipient as an input to the first computational model, the first computational model outputting a score indicative of the new action being performed by the target recipient in response to receiving a message having the each set of message characteristics; selecting a set of message characteristics from the plurality of different sets based on the score output for each set; creating the new message based on the selected set of message characteristics; and sending the new message to the target recipient.

The method can further include, prior to the receiving an instruction to send a new message to the target recipient: operating a second computational model configured to output a score indicative of a message characteristic being associated with a requested action being performed by the target recipient of a message; for each message of a plurality of messages previously transmitted to the target recipient, wherein each of the plurality of messages includes a request for the target recipient to perform an action, and in turn for each message characteristic of a plurality of message characteristics of the each message, providing the each message characteristic along with a determined outcome of the request as an input to the second computational model; and for each of a plurality of message characteristics associated with the target recipient: based on the inputs to the second computational model, the second computational model outputting a score indicative of the each message characteristic being associated with a requested action in a message being performed by the target recipient; and setting a personal profile characteristic specific to the target recipient and to the each message characteristic based on the score output by the second computational model, wherein the plurality of personal profile characteristics specific to the target recipient include an indication, based on scores output by the second computational model, that inclusion of a certain set of one or more message characteristics for the target recipient is associated with a requested action being performed by the target recipient of a message.

Each of the plurality of messages transmitted to the plurality of message recipients can be transmitted by or on behalf of a respective sender of the each message, and the instruction to send a new message to a target recipient can be an instruction to send the new message by or on behalf of a respective sender of the new message. In this case, the method can further include: for each message of the plurality of transmitted messages, further: encoding a plurality of personal profile characteristics specific to the respective sender into a personal profile feature vector for the respective sender; and providing the personal profile feature vector for the respective sender along with the outcome of the request, the message feature vector and the personal profile feature vector for the respective recipient as the training input to the first computational model; encoding a plurality of personal profile characteristics specific to the respective sender of the new message into a personal profile feature vector for the respective sender of the new message; and for each set of message characteristics of the plurality of different sets, further: providing the personal profile feature vector for the respective sender of the new message along with the message feature vector and the personal profile feature vector for the target recipient as the input to the first computational model.

The method can further include, prior to the receiving an instruction to send a new message to the target recipient by or on behalf of the respective sender of the new message: operating a third computational model configured to output a score indicative of a message characteristic being associated with a requested action being performed by a recipient of a message; for each message of a plurality of messages previously transmitted by or on behalf of the respective sender, wherein each of the plurality of messages includes a request for a respective recipient to perform an action, and in turn for each message characteristic of a plurality of message characteristics of the each message, providing the each message characteristic along with a determined outcome of the request as an input to the third computational model; and for each of a plurality message characteristics associated with the respective sender: based on the inputs to the third computational model, the third computational model outputting a score indicative of the each message characteristic being associated with a requested action being performed a recipient of a message; and setting a personal profile characteristic specific to the respective sender and to the each message characteristic based on the score output by the third computational model, wherein the plurality of personal profile characteristics specific to the respective sender include an indication, based on a score output by the third computational model, that inclusion of a certain set of one or more message characteristics for the respective sender is associated with a requested action being performed by a recipient of a message.

The selected set of message characteristics can have a maximum score of the scores output for the plurality of different sets of message characteristics. In this case, the method can further include: determining that the maximum score meets a predetermined threshold before sending the new message to the target recipient.

The method can further include: receiving from an authoring user through a computer user interface a specification of a message template for the new message, wherein the specification of the message template includes an arrangement of: static text common to all messages based on the message template, and variable fields into which different data can be populated for different messages based on the template; wherein the variable fields are populated based on the selected set of message characteristics to create the new message.

Creating the new message based on the selected set of message characteristics can include: presenting to a respective sender of the new message, in a computer user interface, a plurality of options for creating the new message, the plurality of options being based on the selected set of message characteristics; and receiving a selection from the respective sender of the new message, through the computer user interface, of one or more of the plurality of options.

Each requested action can be requested of a respective message recipient in support of a respective advocacy campaign, and the each requested action can be selected from a group consisting of: acting in support of the respective advocacy campaign, sending a further message in support of the respective advocacy campaign, providing financial support to the respective advocacy campaign, contributing time in support of the respective advocacy campaign, creating, proposing, or drafting legislation in support of the advocacy campaign, and voting on legislation in accordance with the advocacy campaign. Each message can be transmitted by one or more of: e-mail, text message, phone call, social media posting, electronic messaging through a messaging platform, and postal mail. Message characteristics can include one or more of: message topic, requested action, complete content of a message, components of message content, message formatting, arrangement of message content within a message, and message metadata. Personal profile characteristics can include one or more facets of personal information. Personal profile characteristics can include one or more message characteristics associated with a requested action being performed by a recipient of a message.

The selected set of message characteristics can indicate inclusion of certain text within a message. The certain text can be a facet of personal information. The facet of personal information can be selected from a group consisting of: biographical details, demographics, custom tags, policy proposals, and votes. The selected set of message characteristics can indicate exclusion of certain text within a message. The selected set of message characteristics can indicate an absolute or relative duration of time since a most recent prior message was sent to the target recipient. The selected set of message characteristics can indicate one or more of a time of day and a day of week when the new message is transmitted.

The first computational model can be one of a machine learning model, a neural network, and a statistical model. The score output by the first computational model can be one of a statistical indication, a probability, a likelihood, a certainty, a value, and an amount.

The method can further include: the first computational model further outputting a confidence value in association with the score indicative of the new action being performed by the target recipient in response to receiving a message having the each set of message characteristics.

A method can be performed by a computer system having at least one processor and a memory. The method can include: operating a first computational model configured to output a score indicative of a requested action being performed by a recipient of a message; transmitting a plurality of messages to a plurality of message recipients, wherein each of the plurality of messages is transmitted by or on behalf of a respective sender and includes a request for a respective recipient to perform an action; for each message of the plurality of transmitted messages: determining an outcome of the request after transmission of the message; encoding a plurality of message characteristics of the message into a message feature vector; encoding a plurality of personal profile characteristics specific to the respective sender into a personal profile feature vector for the respective sender; and providing the outcome of the request, the message feature vector and the personal profile feature vector for the respective sender as a training input to the first computational model; receiving an instruction to send a new message to a target recipient by or on behalf of a respective sender, wherein the new message includes a request for the target recipient to perform a new action; creating a plurality of different sets of message characteristics, wherein each set of the plurality of different sets represents a combination of a plurality of possible message characteristics for the new message; encoding a plurality of personal profile characteristics specific to the respective sender of the new message into a personal profile feature vector for the respective sender of the new message; for each set of message characteristics of the plurality of different sets: encoding the set of message characteristics into a message feature vector; and in response to providing the message feature vector and the personal profile feature vector for the respective sender as an input to the first computational model, the first computational model outputting a score indicative of the new action being performed by the target recipient in response to receiving a message having the each set of message characteristics; selecting a set of message characteristics from the plurality of different sets based on the score output for each set; creating the new message based on the selected set of message characteristics; and sending the new message to the target recipient.

The method can further include, prior to the receiving an instruction to send a new message to the target recipient: operating a second computational model configured to output a score indicative of a message characteristic being associated with a requested action being performed by a recipient of a message; for each message of a plurality of messages previously transmitted by or on behalf of the respective sender, wherein each of the plurality of messages includes a request for a respective recipient to perform an action, and in turn for each message characteristic of a plurality of message characteristics of the each message, providing the each message characteristic along with a determined outcome of the request as an input to the second computational model; and for each of a plurality message characteristics associated with the respective sender: based on the inputs to the second computational model, the second computational model outputting a score indicative of the each message characteristic being associated with a requested action being performed a recipient of a message; and setting a personal profile characteristic specific to the respective sender and to the each message characteristic based on the score output by the second computational model, wherein the plurality of personal profile characteristics specific to the respective sender include an indication, based on a score output by the second computational model, that inclusion of a certain set of one or more message characteristics for the respective sender is associated with a requested action being performed by a recipient of a message.

The method can further include: for each message of the plurality of transmitted messages, further: encoding a plurality of personal profile characteristics specific to the respective recipient into a personal profile feature vector for the respective recipient; and providing the personal profile feature vector for the respective recipient along with the outcome of the request, the message feature vector and the personal profile feature vector for the respective sender as the training input to the first computational model; encoding a plurality of personal profile characteristics specific to the target recipient into a personal profile feature vector for the target recipient; and for each set of message characteristics of the plurality of different sets, further: providing the personal profile feature vector for the target recipient along with the message feature vector and the personal profile feature vector for the respective sender as the input to the first computational model.

The method can further include, prior to the receiving an instruction to send a new message to the target recipient: operating a third computational model configured to output a score indicative of a message characteristic being associated with a requested action being performed by the target recipient of a message; for each message of a plurality of messages previously transmitted to the target recipient, wherein each of the plurality of messages includes a request for the target recipient to perform an action, and in turn for each message characteristic of a plurality of message characteristics of the each message, providing the each message characteristic along with a determined outcome of the request as an input to the third computational model; and for each of a plurality of message characteristics associated with the target recipient: based on the inputs to the third computational model, the third computational model outputting a score indicative of the each message characteristic being associated with a requested action in a message being performed by the target recipient; and setting a personal profile characteristic specific to the target recipient and to the each message characteristic based on the score output by the third computational model, wherein the plurality of personal profile characteristics specific to the target recipient include an indication, based on scores output by the third computational model, that inclusion of a certain set of one or more message characteristics for the target recipient is associated with a requested action being performed by the target recipient of a message.

A method can be performed by a computer system having at least one processor and a memory. The method can include: maintaining one or more databases that store in association with each recipient of a plurality of target message recipients: personal profile data including a plurality of personal profile characteristics specific to the each recipient; for each message of one or more messages previously sent to the each recipient, wherein the each message includes a request for the each recipient to perform an action: message data including a plurality of message characteristics of the each message, and response data including a response to the request after transmission of the each message; and for each recipient of a subset of the plurality of target message recipients: processing the personal profile data, the message data, and the response data to determine correlations between message characteristics and responses by the recipient; based on the determined correlations, selecting one or more message characteristics; and integrating the selected one or more message characteristics into a new message for the recipient.

The method can further include: receiving from an authoring user through a computer user interface a specification of a message template, wherein the specification of the message template includes an arrangement of: static text common to all messages based on the message template, and variable fields into which different data can be populated for different messages based on the template; wherein the selected one or more message characteristics are integrated through the variable fields into the new message based on the message template. The specification of the message template can further include a maximum number of message characteristics to include.

The method can further include: receiving from an authoring user through a computer user interface a specification of search criteria; and applying the search criteria to determine the subset of the plurality of target message recipients based at least on the personal profile data. The personal profile data can include one or more of: biographical details, demographics, and custom tags.

The correlations can be determined by training a machine learning model based on the personal profile data, the message data, and the response data. The machine learning model can be trained, using a set of one or more message feature vectors and personal profile data feature vectors, to determine an association between input profile feature vectors and the response data, the machine learning model including weights computed for one or more input features of the one or more message feature vectors and personal profile feature vectors, wherein each weight reflects a correlation of the one or more input features.

The plurality of message recipients, the personal profile data and the response data can be based on previous interactions with recipient by a single organization or authoring user. The plurality of message recipients, the personal profile data and the response data can be based on previous interactions with recipient by plural unrelated organizations or authoring users. The response data can be configured to characterize at least responses indicating: that the recipient did not respond to the message; and that the recipient took the action requested in the message. The plurality of target message recipients can include potential advocates for an advocacy campaign, and the one or more messages previously sent to the each recipient can be associated with prior advocacy campaigns.

A method can be performed by a computer system having at least one processor and a memory. The method can include: maintaining one or more databases that store data including: a record for each recipient of a plurality of message recipients; for each recipient, a set of plural personal profile characteristics specific to the each recipient; a record for each message template of a plurality of message templates, wherein each message template includes one or more variable fields for receiving message characteristics and one or more static fields storing content common to all messages based on the message template; a record for each message of a plurality of messages, wherein the each message was previously sent to one recipient of the plurality of message recipients based on one of the plurality of message templates; and for each message: an indication of a message template upon which the each message is based, an indication of message characteristics included in the each message, and an indication of an outcome resulting from sending the each message to the one recipient; training a machine learning model based on a portion of the stored data, wherein the trained machine learning model is configured to select a subset of a set of message characteristics using input based on: a message template including one or more variable fields for receiving message characteristics and one or more static fields storing content common to all messages based on the message template; and a set of plural personal profile characteristics specific to a target message recipient; and for each target message recipient of a plurality of target message recipients selected to receive messages based on a current message template: receiving a selected subset of a set of message characteristics in response to providing input to the trained machine learning model, the input being based on the current message template and the set of plural personal profile characteristics specific to the target message recipient; integrating the selected subset of the set of message characteristics into a new message based on the current message template; and causing the new message to be sent to the target message recipient.

The method can further include: receiving from an authoring user through a computer user interface a specification of the current message template, wherein the specification includes an arrangement of the one or more variable fields for receiving message characteristics and the one or more static fields storing content common to all messages based on the message template, and wherein the selected message characteristics are integrated through the variable fields into the new message based on the message template.

The personal profile characteristics can include one or more facets of personal information. A facet of personal information can be selected from a group consisting of: biographical details, demographics, custom tags, policy proposals, and votes. The indication of the outcome resulting from sending the each message to the one recipient can indicate whether the one recipient performed an action requested in the each message. The action requested in the each message can include: selecting a hypertext link to a legislative advocacy website; and at the legislative advocacy website, causing an advocacy position to be communicated to a legislative representative.

The portion of the stored data based upon which the machine learning model is trained can include: for each message of the plurality of messages having a record in the database: the indication of the message template upon which the each message is based, the indication of the message characteristics included in the each message, and the indication of the outcome resulting from sending the each message to the one recipient. The input to the trained machine learning model can further include: a desired outcome of sending a message based on the message template to the target message recipient. The plurality of target message recipients can be selected from the plurality of message recipients. The method can further include: receiving from an authoring user through a computer user interface a specification of search criteria; and applying the search criteria to select the plurality of target message recipients from the plurality of message recipients based at least on the personal profile characteristics specific to the each recipient.

A method can be performed by a computer system having at least one processor and a memory. The method can include: maintaining one or more databases that store data including: a record for each message template of a plurality of message templates, wherein each message template includes one or more variable fields for receiving message characteristics and one or more static fields storing content common to all messages based on the message template; a record for each recipient of a plurality of target message recipients, and for each recipient: a set of plural personal profile characteristics specific to the each recipient; a record for each message of a plurality of messages previously sent to the each recipient; and for each message: an indication of a message template upon which the each message is based; an indication of message characteristics included in the each message; and an indication of an outcome resulting from sending the each message to the each recipient; and for each recipient of a subset of the plurality of target message recipients: training a machine learning model based on a portion of the stored data, wherein the trained machine learning model is configured to select a subset of a set of message characteristics using input based on: a message template including one or more variable fields for receiving message characteristics and one or more static fields storing content common to all messages based on the message template; and a set of personal profile characteristics specific to the each recipient; receiving a selected subset of a set of message characteristics in response to providing input to the trained machine learning model, the input being based on the current message template and the set of plural personal profile characteristics specific the each recipient; integrating the selected subset of message characteristics into a new message based on the current message template; and causing the new message to be sent to the each message recipient.

A method can be performed by a computer system having at least one processor and a memory. The method can include: maintaining one or more databases that store data including: a record for each person of a plurality of people; for each person, a plurality of personal profile characteristics specific to the person; a record for each message template of a plurality of message templates, wherein each message template includes one or more variable fields for receiving message characteristics and one or more static fields storing content common to all messages based on the message template; a record for each message of a plurality of messages, wherein the each message was previously sent by a sending person of the plurality of people to a receiving person of the plurality of people based on one of the plurality of message templates, the each message including a respective request by the sending person for the receiving person to perform an action; and for each message of the plurality of messages, an indication of an outcome of the request by the sending person for the receiving person to perform the action; training a machine learning model based on the data, wherein the trained machine learning model is configured to select a subset from plural message characteristics using input based on: a message template including one or more variable fields for receiving message characteristics and one or more static fields storing content common to all messages based on the message template; a set of personal profile characteristics specific to a sending person; and a set of personal profile characteristics specific to a receiving person; and for each pair of a plurality of pairs of a sending person and a receiving person selected from the plurality of people, the sending person being selected to send a message based on a current message template to the receiving person: receiving a subset selected from plural message characteristics in response to providing input to the trained machine learning model, the input being based on the current message template, the set of personal profile characteristics specific to the sending person, and the set of personal profile characteristics specific to the receiving person; integrating the selected subset of message characteristics into a new message based on the current message template; and causing the new message to be sent by or on behalf of the sending person to the receiving person.

The message characteristics, from which the trained machine learning model is configured to select a subset, can include facets of personal information about the sending person and facets of personal information about the receiving person. The message characteristics, from which the trained machine learning model is configured to select a subset, can include facets of personal information about the sending person. The message characteristics, from which the trained machine learning model is configured to select a subset, can include facets of personal information about the receiving person. The message characteristics, from which the trained machine learning model is configured to select a subset, can consist of facets of personal information about the sending person and facets of personal information about the receiving person. The message characteristics, from which the trained machine learning model is configured to select a subset, can consist of facets of personal information about the sending person. The message characteristics, from which the trained machine learning model is configured to select a subset, consist of facets of personal information about the receiving person.

A method can be performed by a computer system having at least one processor and a memory. The method can include: maintaining one or more databases that store in association with each recipient of a plurality of target message recipients: personal profile data including a plurality of facets of personal information about the recipient, for each message of one or more messages previously sent to the recipient: message data indicating content contained in the each message, and response data characterizing a response by the recipient to the message; and for each recipient of a subset of the plurality of target message recipients: processing the personal profile data, the message data, and the response data to determine correlations between inclusion of certain facets of personal information in message content and responses by the recipient; based on the determined correlations, selecting one or more of the facets from the personal profile data of the recipient; and integrating the selected one or more facets into a new message for the recipient.

The method can include: receiving from an authoring user through a computer user interface a specification of a message template, wherein the specification of the message template includes an arrangement of: static text common to all messages based on the message template, and variable fields into which different data can be populated for different messages based on the template; wherein the selected one or more facets are integrated through the variable fields into the new message based on the message template.

The method can include: receiving from an authoring user through a computer user interface a specification of search criteria; and applying the search criteria to determine the subset of the plurality of target message recipients based at least on the personal profile data.

The personal information can include one or more of: biographical details, demographics, and custom tags.

The correlations can be determined by training a machine learning model based on the personal profile data, the message data, and the response data.

The machine learning model can trained, using a set of one or more message feature vectors and personal profile data feature vectors, to determine an association between input profile feature vectors and the response data, the machine learning model can include weights computed for one or more input features of the one or more message feature vectors and personal profile feature vectors, wherein each weight reflects a correlation of the one or more input features.

The specification of the message template can further include a maximum number of facets to include.

For the plurality of message recipients, the personal profile data and the response data can be based on previous interactions with recipient by a single organization or authoring user.

For the plurality of message recipients, the personal profile data and the response data can be based on previous interactions with recipient by plural unrelated organizations or authoring users.

The response data can be configured to characterize at least responses indicating: that the recipient did not respond to the message; and that the recipient took an action requested in the message.

The plurality of target message recipients can include potential advocates for an advocacy campaign, and the one or more messages previously sent to the recipient can be associated with prior advocacy campaigns.

A method can be performed by a computer system having at least one processor and a memory. The method can include: maintaining one or more databases that store data that can include: a record for each recipient of a plurality of message recipients, for each recipient, a set of plural facets of personal information about the each recipient, a record for each message template of a plurality of message templates, wherein each message template can include one or more variable fields for receiving facets of personal information and one or more static fields storing content common to all messages based on the message template, a record for each message of a plurality of messages, wherein the each message was previously sent to one recipient of the plurality of message recipients based on one of the plurality of message templates, and for each message: an indication of a message template upon which the each message is based, an indication of a subset of the plural facets of personal information about the one recipient included in the each message, and an indication of an outcome resulting from sending the each message to the one recipient; training a machine learning model based on a portion of the stored data, wherein the trained machine learning model is configured to select a subset of a set of plural facets of personal information about a target message recipient using input based on: a message template including one or more variable fields for receiving facets of personal information and one or more static fields storing content common to all messages based on the message template, the set of plural facets of personal information about the target message recipient, and optionally a desired outcome of sending a message based on the message template to the target message recipient; and for each target message recipient of a subset selected from the plurality of message recipients, the subset selected to receive messages based on a current message template: receiving a selected subset of a set of plural facets of personal information about the target message recipient in response to providing input to the trained machine learning model, the input being based on the current message template, the set of plural facets, and optionally a desired outcome; integrating the selected subset of the set of plural facets into a new message based on the current message template; and causing the new message to be sent to the target message recipient.

The method can include: receiving from an authoring user through a computer user interface a specification of the current message template, wherein the specification includes an arrangement of the one or more variable fields for receiving facets of personal information and the one or more static fields storing content common to all messages based on the message template, wherein the selected one or more facets are integrated through the variable fields into the new message based on the message template.

The method can include: receiving from an authoring user through a computer user interface a specification of search criteria; and applying the search criteria to determine the subset selected from the plurality of message recipients based at least on the plural facets of personal information about the each recipient.

The plural facets of personal information can include one or more of: biographical details, demographics, and custom tags.

The indication of the outcome resulting from sending the each message to the one recipient can indicate whether the one recipient performed an action requested in the each message.

The action requested in the each message can include: selecting a hypertext link to a legislative advocacy website; and at the legislative advocacy website, causing an advocacy position to be communicated to a legislative representative.

The portion of the stored data based upon which the machine learning model is trained can include: for each message of the plurality of messages having a record in the database: the indication of the message template upon which the each message is based, the indication of the subset of the plural facets of personal information about the one recipient included in the each message, and the indication of the outcome resulting from sending the each message to the one recipient.

A method can be performed by a computer system having at least one processor and a memory. The method can include: maintaining one or more databases that store data that can include: a record for each recipient of a plurality of message recipients, for each recipient, a set of plural facets of personal information about the recipient, a record for each message template of a plurality of message templates, wherein each message template includes one or more variable fields for receiving facets of personal information and one or more static fields storing content common to all messages based on the message template, a record for each message of a plurality of messages, wherein the each message was previously sent to one recipient of the plurality of message recipients based on one of the plurality of message templates, and for each message of the plurality of messages, an indication of an outcome resulting from sending the each message to the one recipient; training a machine learning model based on the data, wherein the trained machine learning model is configured to select a subset of a set of plural facets of personal information about a target message recipient using input based on: a message template including one or more variable fields for receiving facets of personal information and one or more static fields storing content common to all messages based on the message template, the set of plural facets of personal information about the target message recipient, and optionally a desired outcome of sending a message based on the message template to the target message recipient; and for each of a plurality of target message recipients selected to receive messages based on a current message template: receiving a selected subset of a set of plural facets of personal information about the target message recipient in response to providing input to the trained machine learning model, the input being based on the current message template, the set of plural facets, and optionally a desired outcome; integrating the selected subset of the set of plural facets into a new message based on the current message template; and causing the new message to be sent to the target message recipient.

A method can be performed by a computer system having at least one processor and a memory. The method can include: maintaining one or more databases that store data that can include: a record for each message template of a plurality of message templates, wherein each message template includes one or more variable fields for receiving facets of personal information and one or more static fields storing content common to all messages based on the message template, a record for each recipient of a plurality of target message recipients, and for each recipient: a set of plural facets of personal information about the each recipient, a record for each message of a plurality of messages previously sent to the each recipient, and for each message: an indication of a message template upon which the each message is based, an indication of a subset of the plural facets of personal information about the each recipient included in the each message, and an indication of an outcome resulting from sending the each message to the each recipient; and for each recipient of a subset of the plurality of target message recipients: training a machine learning model based on a portion of the stored data, wherein the trained machine learning model is configured to select a subset of the set of plural facets of personal information about the each message recipient using input based on: a message template including one or more variable fields for receiving facets of personal information and one or more static fields storing content common to all messages based on the message template, the set of plural facets of personal information about the each recipient, and optionally a desired outcome of sending a message based on the message template to the each recipient; receiving a selected subset of the set of plural facets of personal information about the each recipient in response to providing input to the trained machine learning model, the input being based on the current message template, the set of plural facets, and optionally a desired outcome; integrating the selected subset of the set of plural facets into a new message based on the current message template; and causing the new message to be sent to the target message recipient.

A method can be performed by a computer system having at least one processor and a memory. The method can include: maintaining one or more databases that store data that can include: a record for each person of a plurality of people, for each person, a set of plural facets of personal information about the person, a record for each message template of a plurality of message templates, wherein each message template includes one or more variable fields for receiving facets of personal information and one or more static fields storing content common to all messages based on the message template, a record for each message of a plurality of messages, wherein the each message was previously sent by a sending person of the plurality of people to a receiving person of the plurality of people based on one of the plurality of message templates, and for each message of the plurality of messages, an indication of an outcome resulting from the sending person sending the each message to the receiving person; training a machine learning model based on the data, wherein the trained machine learning model is configured to select a subset of a set of plural facets of personal information about a sending person using input based on: a message template including one or more variable fields for receiving facets of personal information and one or more static fields storing content common to all messages based on the message template, the set of plural facets of personal information about the sending person, a set of plural facets of personal information about a receiving person, and optionally a desired outcome of the sending person sending a message based on the message template to the receiving person; and for each pair of a plurality of pairs of a sending person and a receiving person selected from the plurality of people, the sending person being selected to send a message based on a current message template to the receiving person: receiving a selected subset of a set of plural facets of personal information about the sending person in response to providing input to the machine learning model, the input being based on the current message template, the set of plural facets of personal information about the sending person, the set of plural facets about the receiving person, and optionally a desired outcome; integrating the selected subset of the set of plural facets into a new message based on the current message template; and causing the new message to be sent by or on behalf of the sending person to the receiving person.

A method can be performed by a computer system having at least one processor and a memory. The method can include: maintaining one or more databases that store data that can include: a record for each person of a plurality of people, for each person, a set of plural facets of personal information about the person, a record for each message template of a plurality of message templates, wherein each message template includes one or more variable fields for receiving facets of personal information and one or more static fields storing content common to all messages based on the message template, a record for each message of a plurality of messages, wherein the each message was previously sent by a sending person of the plurality of people to a receiving person of the plurality of people based on one of the plurality of message templates, and for each message of the plurality of messages, an indication of an outcome resulting from the sending person sending the each message to the receiving person; training a machine learning model based on the data, wherein the trained machine learning model is configured to select a subset from plural facets of personal information using input based on: a message template including one or more variable fields for receiving facets of personal information and one or more static fields storing content common to all messages based on the message template, a set of plural facets of personal information about a sending person, a set of plural facets of personal information about a receiving person, and optionally a desired outcome of the sending person sending a message based on the message template to the receiving person; and for each pair of a plurality of pairs of a sending person and a receiving person selected from the plurality of people, the sending person being selected to send a message based on a current message template to the receiving person: receiving a subset selected from plural facets of personal information in response to providing input to the trained machine learning model, the input being based on the current message template, the set of plural facets of personal information about the sending person, the set of plural facets about the receiving person, and optionally a desired outcome; integrating the selected subset of the set of plural facets into a new message based on the current message template; and causing the new message to be sent by or on behalf of the sending person to the receiving person.

The plural facets of personal information, from which the trained machine learning model is configured to select a subset, can include the set of plural facets of personal information about the sending person and the set of plural facets of personal information about the receiving person.

The plural facets of personal information, from which the trained machine learning model is configured to select a subset, can include the set of plural facets of personal information about the sending person.

The plural facets of personal information, from which the trained machine learning model is configured to select a subset, can include the set of plural facets of personal information about the receiving person.

The plural facets of personal information, from which the trained machine learning model is configured to select a subset, can be limited to the set of plural facets of personal information about the sending person and the set of plural facets of personal information about the receiving person.

The plural facets of personal information, from which the trained machine learning model is configured to select a subset, can be limited to the set of plural facets of personal information about the sending person.

The plural facets of personal information, from which the trained machine learning model is configured to select a subset, can be limited to the set of plural facets of personal information about the receiving person.

A method can be performed by a computer system having at least one processor and a memory. The method can include: maintaining one or more databases that store data for a system user, the data can include: a record for each issue of one or more subject matter issues of importance to the system user, for each issue, a characterization of the issue, a record for each messaging campaign of one or more messaging campaigns, each messaging campaign being by the system user and to a plurality of recipients, and for each messaging campaign: an association with an issue, of the one or more subject matter issues, representing a focus of the messaging campaign, and results data characterizing a result or results of the messaging campaign; calculating an issue importance model based on the stored data, wherein the issue importance model is configured to determine a score using input based on: a candidate document to be considered for presentation to the system user, and optionally desired results data for a messaging campaign focusing on a subject matter issue of the candidate document; determining a score by providing input to the issue importance model, the input being based on: the candidate document, and optionally the desired results data; and in response to determining that the score exceeds a predetermined threshold, causing the candidate document to be presented to the user in association with an option to initiate a messaging campaign focused on the subject matter of the candidate document.

The characterization of the issue can include a natural language text description of the issue.

The results data can include an indication, for each of the plurality of recipients, of whether the each recipient performed an action requested in the messaging campaign.

The candidate document can be any one of: a web page, a portion of a web page, a pdf document, a word processing document, a retrievable document in digital form viewable through a document reader, a news article, a policy proposal, and a social media posting.

The method can include retrieving the candidate document to be considered for presentation to the system user, wherein the candidate document is retrieved by: operating a web crawler configured to find and retrieve documents from uniform resource indicators available on the Internet; and filtering the retrieved documents based on the one or more subject matter issues of importance to the system user.

The method can include receiving the candidate document to be considered for presentation to the system user through a data feed, the data feed being configured to provide documents based on a set of search criteria.

The set of search criteria can be based on the one or more subject matter issues of importance to the system user.

The issue importance model can be further configured to determine the score based on a set of weights of impact factors.

A method can be performed by a computer system having at least one processor and a memory. The method can include: maintaining one or more databases that store data for a system user, the data can include: a record for each issue of one or more subject matter issues of importance to the system user, for each issue, a characterization of the issue, a record for each messaging campaign of one or more messaging campaigns, each messaging campaign being by the system user and to a plurality of recipients, and for each messaging campaign: an association with an issue, of the one or more subject matter issues, representing a focus of the messaging campaign, and results data characterizing a result or results of the messaging campaign; training a machine learning model based on the stored data, wherein the trained machine learning model is configured to determine a score using input based on: a candidate document to be considered for presentation to the system user, and optionally desired results data for a messaging campaign focusing on a subject matter issue of the candidate document; determining a score by providing input to the trained machine learning model, the input being based on: the candidate document, and optionally the desired results data; and in response to determining that the score exceeds a predetermined threshold, causing the candidate document to be presented to the user in association with an option to initiate a messaging campaign focused on the subject matter of the candidate document.

A system can include one or more computer systems configured to perform or that perform any one or more of the foregoing methods.

A non-transitory computer-readable medium can be encoded with computer code that, when executed by one or more computer systems, causes or is executed to cause the one or more computer systems to perform any one or more of the foregoing methods.

Conclusion

As will be appreciated by one skilled in the art, multiple aspects described above can be variously combined in different operable embodiments. All such operable combinations, though they may not be explicitly set forth in the interest of efficiency, are specifically contemplated by this disclosure.

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

The invention claimed is:

1. A method performed by a computer system having at least one processor and a memory, the method comprising, the computer system:
   operating a first computational model configured to output a score indicative of a requested action being performed by a recipient of a message;
   transmitting a plurality of messages to a plurality of message recipients, wherein each of the plurality of messages is transmitted by or on behalf of a respective sender and includes a request for a respective recipient to perform an action;
   for each message of the plurality of transmitted messages:
      determining an outcome of the request after transmission of the message;
      encoding a plurality of message characteristics of the message into a message feature vector;
      encoding a plurality of personal profile characteristics specific to the respective sender into a personal profile feature vector for the respective sender; and
      providing the outcome of the request, the message feature vector and the personal profile feature vector for the respective sender as a training input to the first computational model;
   receiving an instruction to send a new message to a target recipient by or on behalf of a respective sender, wherein the new message includes a request for the target recipient to perform a new action;
   creating a plurality of different sets of message characteristics, wherein each set of the plurality of different sets represents a combination of a plurality of possible message characteristics for the new message;
   encoding a plurality of personal profile characteristics specific to the respective sender of the new message into a personal profile feature vector for the respective sender of the new message;
   for each set of message characteristics of the plurality of different sets:
      encoding the set of message characteristics into a message feature vector; and
      in response to providing the message feature vector and the personal profile feature vector for the respective sender as an input to the first computational model, the first computational model outputting a score indicative of the new action being performed by the target recipient in response to receiving a message having the each set of message characteristics;
   selecting a set of message characteristics from the plurality of different sets based on the score output for each set;
   creating the new message based on the selected set of message characteristics; and
   sending the new message to the target recipient.

2. The method of claim 1, further comprising, prior to the receiving an instruction to send a new message to the target recipient:
   operating a second computational model configured to output a score indicative of a message characteristic being associated with a requested action being performed by a recipient of a message;
   for each message of a plurality of messages previously transmitted by or on behalf of the respective sender, wherein each of the plurality of messages includes a request for a respective recipient to perform an action, and in turn for each message characteristic of a plurality of message characteristics of the each message, providing the each message characteristic along with a determined outcome of the request as an input to the second computational model; and
   for each of a plurality message characteristics associated with the respective sender:
      based on the inputs to the second computational model, the second computational model outputting a score indicative of the each message characteristic being associated with a requested action being performed a recipient of a message; and
      setting a personal profile characteristic specific to the respective sender and to the each message characteristic based on the score output by the second computational model,
   wherein the plurality of personal profile characteristics specific to the respective sender comprise an indication, based on a score output by the second computational model, that inclusion of a certain set of one or more message characteristics for the respective sender is associated with a requested action being performed by a recipient of a message.

3. The method of claim 2, further comprising:
   for each message of the plurality of transmitted messages, further:
      encoding a plurality of personal profile characteristics specific to the respective recipient into a personal profile feature vector for the respective recipient; and
      providing the personal profile feature vector for the respective recipient along with the outcome of the request, the message feature vector and the personal profile feature vector for the respective sender as the training input to the first computational model;

encoding a plurality of personal profile characteristics specific to the target recipient into a personal profile feature vector for the target recipient; and for each set of message characteristics of the plurality of different sets, further:

providing the personal profile feature vector for the target recipient along with the message feature vector and the personal profile feature vector for the respective sender as the input to the first computational model.

4. The method of claim 3, further comprising, prior to the receiving an instruction to send a new message to the target recipient:

operating a third computational model configured to output a score indicative of a message characteristic being associated with a requested action being performed by the target recipient of a message;

for each message of a plurality of messages previously transmitted to the target recipient, wherein each of the plurality of messages includes a request for the target recipient to perform an action, and in turn for each message characteristic of a plurality of message characteristics of the each message, providing the each message characteristic along with a determined outcome of the request as an input to the third computational model; and for each of a plurality of message characteristics associated with the target recipient:

based on the inputs to the third computational model, the third computational model outputting a score indicative of the each message characteristic being associated with a requested action in a message being performed by the target recipient; and setting a personal profile characteristic specific to the target recipient and to the each message characteristic based on the score output by the third computational model, wherein the plurality of personal profile characteristics specific to the target recipient comprise an indication, based on scores output by the third computational model, that inclusion of a certain set of one or more message characteristics for the target recipient is associated with a requested action being performed by the target recipient of a message.

5. The method of claim 1, wherein the selected set of message characteristics has a maximum score of the scores output for the plurality of different sets of message characteristics, the method further comprising:

determining that the maximum score meets a predetermined threshold before sending the new message to the target recipient.

6. The method of claim 1, further comprising:

receiving from an authoring user through a computer user interface a specification of a message template for the new message, wherein the specification of the message template comprises an arrangement of:

static text common to all messages based on the message template, and variable fields into which different data can be populated for different messages based on the template;

wherein the variable fields are populated based on the selected set of message characteristics to create the new message.

7. The method of claim 1, wherein creating the new message based on the selected set of message characteristics comprises:

presenting to a respective sender of the new message, in a computer user interface, a plurality of options for creating the new message, the plurality of options being based on the selected set of message characteristics; and receiving a selection from the respective sender of the new message, through the computer user interface, of one or more of the plurality of options.

8. The method of claim 1, wherein each requested action is requested of a respective message recipient in support of a respective advocacy campaign, and wherein the each requested action is selected from a group consisting of:

acting in support of the respective advocacy campaign, sending a further message in support of the respective advocacy campaign, providing financial support to the respective advocacy campaign, contributing time in support of the respective advocacy campaign, creating, proposing, or drafting legislation in support of the advocacy campaign, and voting on legislation in accordance with the advocacy campaign; and wherein each message is transmitted by one or more of:

e-mail, text message, phone call, social media posting, electronic messaging through a messaging platform, and postal mail.

9. The method of claim 1, wherein message characteristics comprise one or more of:

message topic, requested action, complete content of a message, components of message content, message formatting, arrangement of message content within a message, and message metadata.

10. The method of claim 1, wherein personal profile characteristics comprise one or more facets of personal information.

11. The method of claim 1, wherein personal profile characteristics comprise one or more message characteristics associated with a requested action being performed by a recipient of a message.

12. The method of claim 1, wherein the selected set of message characteristics indicates inclusion of certain text within a message.

13. The method of claim 12, wherein the certain text is a facet of personal information.

14. The method of claim 13, wherein the facet of personal information is selected from a group consisting of: biographical details, demographics, custom tags, policy proposals, and votes.

15. The method of claim 1, wherein the selected set of message characteristics indicates exclusion of certain text within a message.

16. The method of claim 1, wherein the selected set of message characteristics indicates an absolute or relative duration of time since a most recent prior message was sent to the target recipient.

17. The method of claim 1, wherein the selected set of message characteristics indicates one or more of a time of day and a day of week when the new message is transmitted.

18. The method of claim 1, wherein the first computational model is one of a machine learning model, a neural network, and a statistical model.

19. The method of claim 1, wherein the score output by the first computational model is one of a statistical indication, a probability, a likelihood, a certainty, a value, and an amount.

20. The method of claim 1, further comprising, the first computational model further outputting a confidence value in association with the score indicative of the new action being performed by the target recipient in response to receiving a message having the each set of message characteristics.

\* \* \* \* \*